US007957043B2

(12) United States Patent
Morizono et al.

(10) Patent No.: US 7,957,043 B2
(45) Date of Patent: Jun. 7, 2011

(54) IMAGE RECORDING APPARATUS AND IMAGE RECORDING METHOD

(75) Inventors: Osamu Morizono, Kyoto (JP); Satoshi Yasuda, Kyoto (JP); Yoshiyuki Nishigaito, Kyoto (JP)

(73) Assignee: Dainippon Screen MFG Co., Ltd., Kyoto (JP)

( * ) Notice: Subject to any disclaimer, the term of this patent is extended or adjusted under 35 U.S.C. 154(b) by 1288 days.

(21) Appl. No.: 11/525,957

(22) Filed: Sep. 25, 2006

(65) Prior Publication Data

US 2007/0070361 A1 Mar. 29, 2007

(30) Foreign Application Priority Data

Sep. 29, 2005 (JP) ................................ P2005-283340
Apr. 26, 2006 (JP) ................................ P2006-121708

(51) Int. Cl.
*G02B 26/00* (2006.01)
*G06K 15/10* (2006.01)
*H04N 1/46* (2006.01)

(52) U.S. Cl. .......................... 358/504; 358/1.5; 359/290

(58) Field of Classification Search ................... 358/1.1, 358/1.4, 1.5, 1.9, 500, 504; 359/290
See application file for complete search history.

(56) References Cited

U.S. PATENT DOCUMENTS

| | | | |
|---|---|---|---|
| 5,668,588 A | 9/1997 | Morizumi et al. | |
| 6,822,670 B2 | 11/2004 | Hirawa | |
| 2002/0050998 A1 | 5/2002 | Sasaki | |
| 2003/0107658 A1 | 6/2003 | Huang et al. | |
| 2003/0179434 A1* | 9/2003 | Hirawa | 359/290 |
| 2005/0099532 A1 | 5/2005 | Tseng | |

FOREIGN PATENT DOCUMENTS

| | | |
|---|---|---|
| CN | 100542820 C | 9/2009 |
| EP | 1 107 024 A1 | 11/2000 |
| EP | 1 347 446 A2 | 9/2003 |
| EP | 1 349 107 A1 | 10/2003 |
| JP | 6-91928 | 4/1994 |
| JP | 6-316106 | 11/1994 |
| JP | 2001-150730 | 6/2001 |
| JP | 2004-4525 | 1/2004 |
| TW | 576981 | 2/2004 |
| TW | 589862 | 6/2004 |
| TW | 1231606 | 4/2005 |
| TW | 1234396 | 6/2005 |

OTHER PUBLICATIONS

Taiwanese Office Action issued in Taiwanese Patent Application No. TW 095135087 dated Dec. 10, 2009.
European Search Report issued in European Patent Application No. EP 06019508.8-1251, dated Apr. 10, 2008.

* cited by examiner

*Primary Examiner* — James A Thompson
(74) *Attorney, Agent, or Firm* — McDermott Will & Emery LLP

(57) ABSTRACT

In an image recording apparatus, shift times for shifting switching timings of light modulator elements are obtained so that rise times (U1) after input of output start signals to driving elements connected to respective light modulator elements of a spatial light modulator and fall times (D1) after input of output stop signals become a constant target rise time (U2) and a constant target fall time (D2). This makes it possible to suppress unevenness of the rise times and the fall times after correction of light amounts even if light modulator elements where the rise times and the fall times change by correction of light amounts are used and consequently, an image can be appropriately recorded without a complicate apparatus.

16 Claims, 21 Drawing Sheets

F/G. 27

IMAGE RECORDING APPARATUS AND IMAGE RECORDING METHOD

BACKGROUND OF THE INVENTION

1. Field of the Invention

The present invention relates to an image recording apparatus and an image recording method for recording an image on a recording medium by using a plurality of light modulator elements.

2. Description of the Background Art

Developed has been a diffraction grating type light modulator element which is capable of changing the depth of grating by alternately forming fixed ribbons and moving ribbons on a substrate with a semiconductor device manufacturing technique and sagging the moving ribbons relatively to the fixed ribbons. It is proposed that such a diffraction grating is used for an image recording apparatus in techniques such as CTP (Computer to Plate) as a switching element of light, since the intensities of normally reflected light and diffracted light are changed by changing the depth of grooves on the diffraction grating as above.

For example, a plurality of diffraction grating type light modulator elements provided in the image recording apparatus are irradiated with light, and then reflected light (zeroth order light) from light modulator elements in a state where the fixed ribbons and the moving ribbons are positioned at the same height from a base surface is guided to the recording medium and non-zeroth order light (mainly first order light) from light modulator elements in a state where the moving ribbons are sagged is blocked, to achieve an image recording on the recording medium.

Japanese Patent Application Laid Open Gazette No. 2004-4525 (Document 1) discloses a technique correcting the timing of transition between ON and OFF states of a light modulator element in such an image recording apparatus to correct asymmetry between transition from the OFF state to the ON state and transition from the ON state to the OFF state, difference in characteristics of each photosensitive material, and positional shifts of writing regions caused by difference in length or position in a scan direction of irradiation regions of light modulator elements.

Japanese Patent Application Laid Open Gazette No. 2001-150730 (Document 2) discloses a technique for forcedly interrupting light from liquid crystal shutters during a transient response period with a mechanical shutter to remove effects of unevenness in exposure by the liquid crystal shutters and difference in transient responses of the liquid crystal shutters in an image forming apparatus.

In the diffraction grating type light modulator elements, amounts of light derived from light modulator elements slightly vary even if all light modulator elements are made the ON state, because there are nonuniformity of light from a light source and differences of characteristics among the light modulator elements. Since such a variation causes striped moire in writing an image of a fine pattern, it is important that a light amount from each light modulator element is corrected to be uniform by controlling the height of the moving ribbons in the ON state.

However, in a case where the heights of the moving ribbons in the ON state are different in light modulator elements, since the amounts of movement of the moving ribbons between the ON and OFF states are not uniform, a time from when a signal instructing ON is inputted to a driving element of the light modulator element to when the light modulator element is actually brought into the ON state (hereinafter, referred to as "rise time") and a time from when a signal instructing OFF is inputted to the driving element of the light modulator element to when the light modulator element is actually brought into the OFF state (hereinafter, referred to as "fall time") are different from those in another light modulator element.

In Document 1, the unevenness of the rise times and the fall times, that is, temporal unevenness in movement of the light modulator elements with respect to the signal instructing driving is not taken into consideration. Consequently, when a line with a constant width extending in a sub scan direction is written, the line width slightly changes. Though Document 2 discloses a technique for removing effects of unevenness in the transient response at the rise in liquid crystal shutters by using the mechanical shutter, since light is blocked mechanically, the mechanism of the apparatus becomes complicated and speed-up of writing is prevented. Further Document 2 also discloses a technique of controlling timing at the fall to make the exposure amount uniform, however, unevenness in the transient response at the fall is not considered.

SUMMARY OF THE INVENTION

The present invention is intended for an image recording apparatus for recording an image on a recording medium by irradiation with light and when writing for a predetermined period of time is instructed to light modulator elements, it is an object of the present invention to perform writing by a constant distance in a scan direction, that is, to write lines with a constant width in a direction perpendicular to the scan direction. Further, even if a photosensitive level of a recording medium is unknown, when writing for a predetermined period of time is instructed to each light modulator element, it is an object to write by a constant distance in the scan direction.

The image recording apparatus in accordance with the present invention comprises a spatial light modulator having a plurality of light modulator elements which are arranged in a predetermined direction; a holding part for holding a recording medium on which an image is recorded with signal lights from the plurality of light modulator elements; a moving mechanism for moving the holding part relatively to the spatial light modulator at a constant speed in a main scan direction crossing an arrangement direction of positions irradiated with light from the plurality of light modulator elements and moving the holding part relatively to the spatial light modulator in a sub scan direction crossing the main scan direction; a control part controlling the spatial light modulator and the moving mechanism, to perform image recording on a recording medium; a photodetector for detecting light from each element of the plurality of light modulator elements; and a shift-time determining part for determining a shift time of a switching timing of each element after input of an output start signal instructing start of output of signal light or an output stop signal instructing stop of output of signal light to a driving element connected to each element, on the basis of output of the photodetector after input of an output start signal or an output stop signal and in the apparatus, the driving element comprises a shift section for shifting a switching timing of each element at the time when an output start signal or an output stop signal is inputted to the driving element in image recording, in accordance with the shift time, and when writing for a predetermined period of time is instructed, a distance in the main scan direction of writing actually performed on a recording medium by the plurality of light modulator elements is made constant by shift of a switching timing of each element by the shift section.

By providing the shift section, when writing for a predetermine period of time is instructed, it is possible to made a distance in the main scan direction of writing actually performed on a recording medium by the plurality of light modulator elements constant and achieve appropriate image recording, without complicating the apparatus.

According to a preferred embodiment of the present invention, the shift-time determining part comprises a circuit generating a reference voltage; a comparator for comparing output from the photodetector with the reference voltage; a clock generating circuit for generating sampling clocks; and a counter for counting the sampling clocks, to acquire a rise time from when an output start signal is inputted to the driving element connected to each element to when the comparator detects that output from the photodetector is above the reference voltage and a fall time from when an output stop signal is inputted to the driving element to when the comparator detects that output from the photodetector is below the reference voltage, and the shift time of each element is determined on the basis of the rise time and the fall time.

In a case where a photosensitive level of a photosensitive material is known, the rise time is equal to a time from when an output start signal is inputted to the driving element connected to each element to when photosensing of a recording medium is started, and the fall time is equal to a time from when an output stop signal is inputted to the driving element to when photosensing of the recording medium is stopped. The shift time of each element is determined as a time for compensating a difference between a predetermined value and a difference between the rise time and the fall time in the shift-time determining part. This makes it possible to determine the shift time easily.

In a case where a photosensitive level of a photosensitive material is unknown, the shift-time determining part obtains a plurality of provisional shift times for compensating a difference between a predetermined value and a difference between the rise time and the fall time of each element at a plurality of correction ratios, and lines extending in the sub scan direction are written onto the recording medium by the control part and the shift section while the plurality of provisional shift times are sequentially applied to each element. By specifying a preferable line out of a plurality of lines, a correction ratio corresponding to the preferable line out of the plurality of correction ratios can be selected and inputted to the shift-time determining part and the shift time of each element is determined on the basis of the correction ratio. This makes it possible to determine the shift time relatively easily.

It is preferable that the present invention is applied to an image recording apparatus comprising a spatial light modulator with elements in each of which the rise time and the fall time change when intensity of signal light is changed and as such an element, can be used a light modulator element of diffraction grating type in which strip-like fixed reflection surfaces and strip-like moving reflection surfaces are alternately arranged.

The present invention is also intended for an image recording method for recording an image on a recording medium by irradiation with light.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
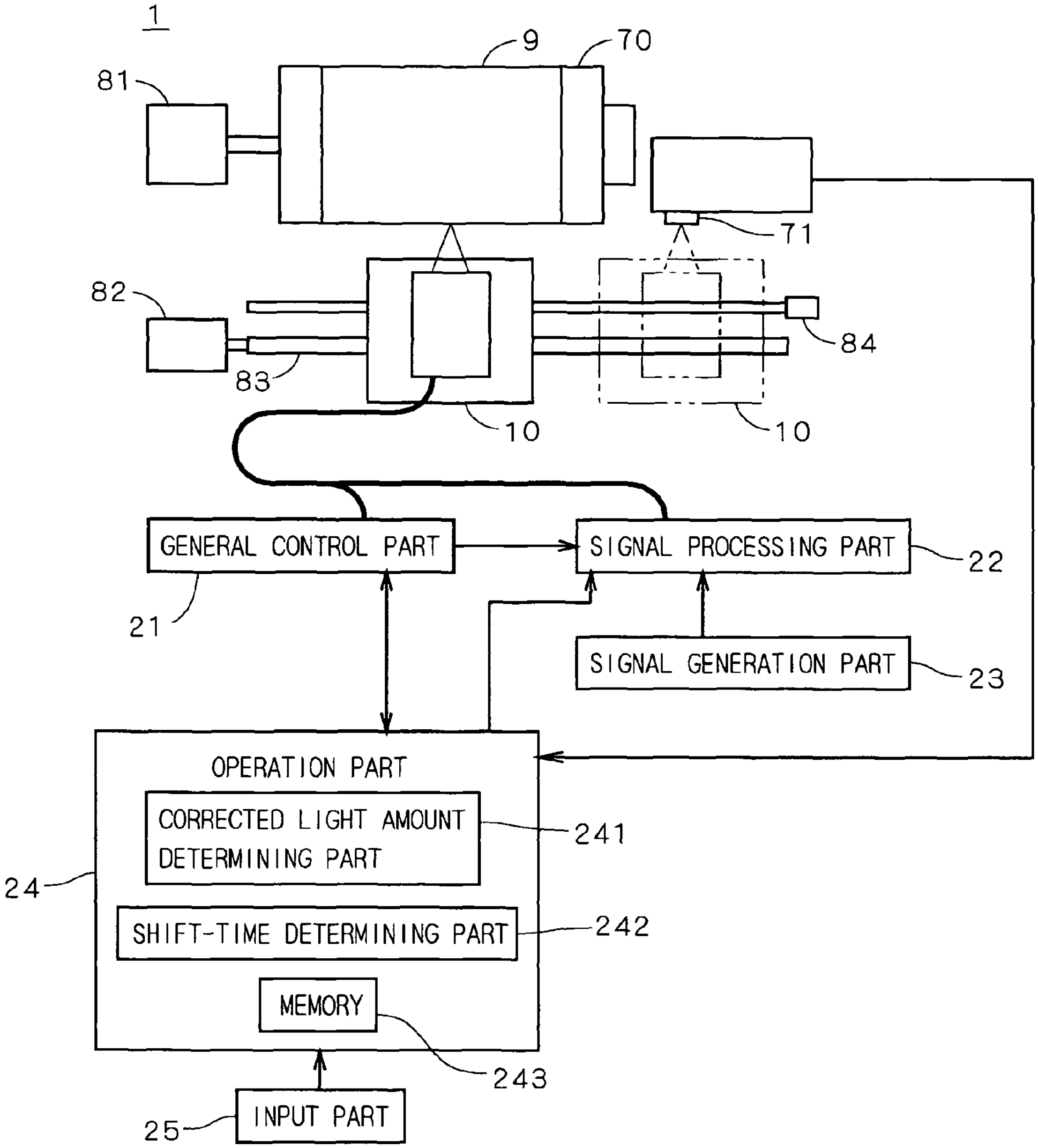
FIG. 1 is a view showing a constitution of an image recording apparatus in accordance with a first preferred embodiment.

FIG. 1 is a view showing a constitution of an image recording apparatus 1 in accordance with the first preferred embodiment of the present invention. The image recording apparatus 1 has an optical head 10 which emits light for recording an image and a holding drum 70 which is a holding part for holding a recording medium 9 on its outer surface. An image is recorded on the recording medium 9 by performing writing by irradiation with light (exposure) from the optical head 10. As the recording medium 9, for example, used are a printing plate, a film for forming the printing plate and the like. A photosensitive drum for plateless printing may be used as the holding drum 70 and in this case, it is understood that the recording medium 9 corresponds to a surface of the photosensitive drum and the holding drum 70 holds the recording medium 9 as a unit.

The holding drum 70 rotates about a central axis of its cylindrical surface by a motor 81 and the optical head 10 thereby travels relatively to the recording medium 9 at a constant speed in a main scan direction (in a direction perpendicular to an arrangement direction of positions irradiated with light from a plurality of light modulator elements later discussed). The optical head 10 can be moved by a motor 82 and a ball screw 83 in parallel to a rotation axis of the holding drum 70 in a sub scan direction (orthogonal to the main scan direction). The position of the optical head 10 is detected by an encoder 84. In other words, a moving mechanism including the motors 81 and 82 and the ball screw 83 moves the outer surface of the holding drum 70 and the recording medium 9 relatively to the optical head 10 having a spatial light modulator at a constant speed in the main scan direction and moves those relatively to the optical head 10 also in the sub scan direction crossing the main scan direction. The motors 81 and 82 and the encoder 84 are connected to a general control part 21, and the general control part 21 controls the motors 81 and 82 and emission of signal light from a spatial light modulator in the optical head 10, to record an image on the recording medium 9 on the holding drum 70 by light.

Data of the image to be recorded on the recording medium 9 is prepared in a signal generation part 23 in advance, and a signal processing part 22 receives an image signal in synchronization with the signal generation part 23 on the basis of a control signal from the general control part 21. The signal processing part 22 converts the received image signal into a signal for the optical head 10 and then transmits the signal.

At the side of the holding drum 70, a detection part 71 for detecting light from each light modulator element of the spatial light modulator in the optical head 10 is provided, and the optical head 10 can be transferred by the motor 82 and the ball screw 83 up to the position to which the optical head 10 passes the detection part 71. An output from the detection part 71 is inputted to a calculation part 24. The calculation part 24 performs computation with circuits such as a CPU, which generates data for controlling the optical head 10 by computation of the output from the detection part 71. The calculation part 24 has a memory 243 for storing information from the detection part 71 and the CPU, the memory and the like implement functions shown as a corrected light amount determining part 241 and a shift-time determining part 242 which are later discussed. An input part 25 receiving an input from a user is connected to the calculation part 24.

Figure 2:
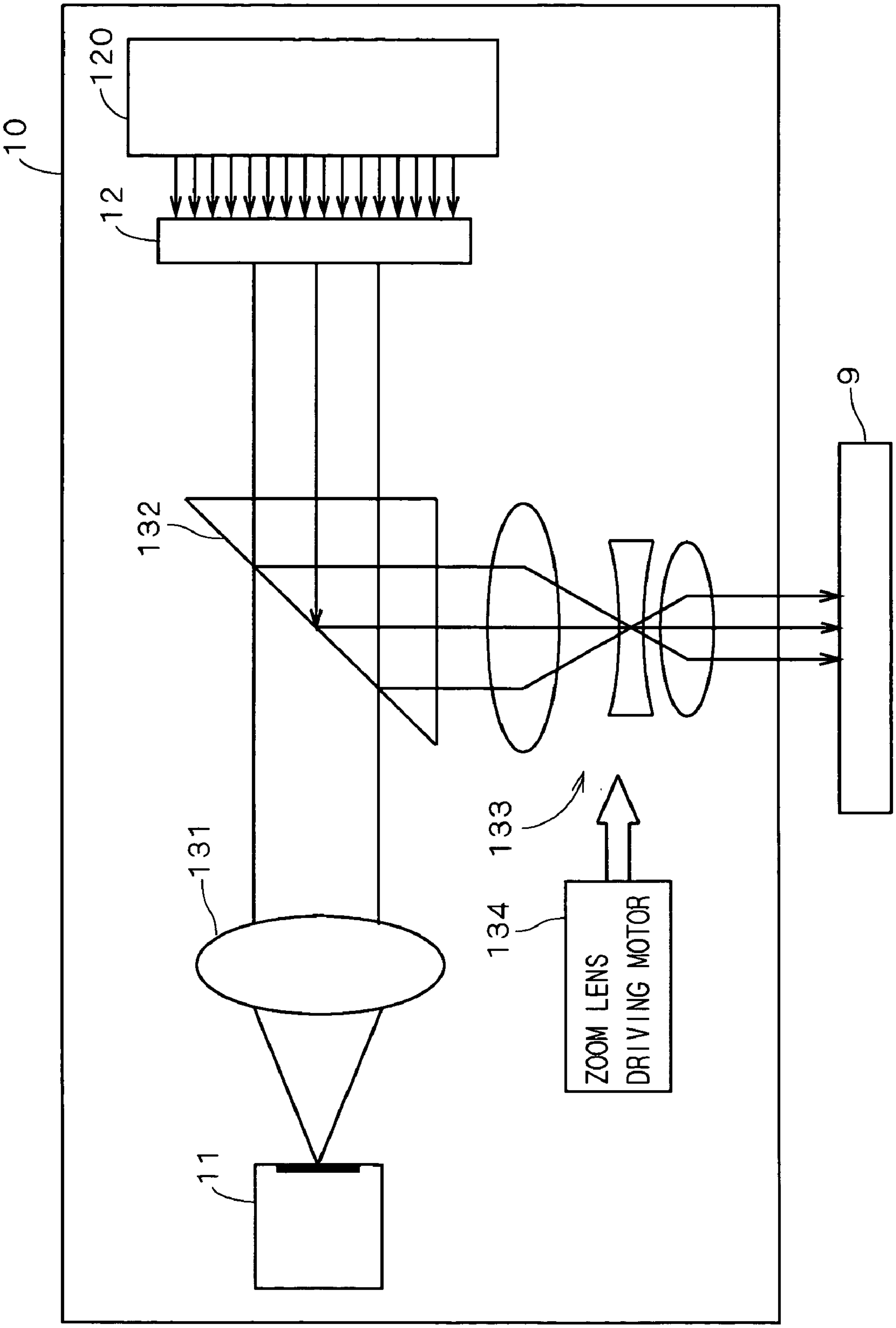
FIG. 2 is a schematic view showing an internal constitution of an optical head.

FIG. 2 is a schematic view showing an internal constitution of the optical head 10. In the optical head 10 disposed are a light source 11 which is a bar-type semiconductor laser, having a plurality of light emitting points which are aligned and a spatial light modulator 12 having a plurality of diffraction grating type light modulator elements which are aligned. Light from the light source 11 is guided to the spatial light modulator 12 through lenses 131 (actually consisting of a condensing lens, a cylindrical lens and the like) and a prism 132. In this case, the light from the light source 11 is linear light (light having a linear section of luminous flux), and applied onto a plurality of light modulator elements which are arranged linearly.

Each light modulator element in the spatial light modulator 12 is individually controlled on the basis of a signal from a device driving circuit 120 and each light modulator element can be changed between a state of emitting a zeroth order light beam (normally reflected light beam) and a state of emitting non-zeroth order diffracted light beams (mainly first order diffracted light beams ((+1)st order diffracted light beam and (−1)st order diffracted light beam)). The zeroth order light beam emitted from the light modulator element is returned to the prism 132 and the first order diffracted light beams are guided to directions different from that of the prism 132. The first order diffracted light beams are blocked by a not-shown light blocking part so as not to be stray light.

The zeroth order light beam from each light modulator element is reflected by the prism 132 and guided to the recording medium 9 outside the optical head 10 through a zoom lens 133 and a plurality of spot images of the light modulator elements are so formed on the recording medium 9 as to be arranged in the sub scan direction. In other words, in the light modulator elements 121, the state of emitting the zeroth order light beam is an ON state and the state of emitting the first order diffracted light beams is an OFF state. The magnification of the zoom lens 133 can be changed by a zoom lens driving motor 134 and the resolution of the image to be recorded is thereby changed.

Figure 3:
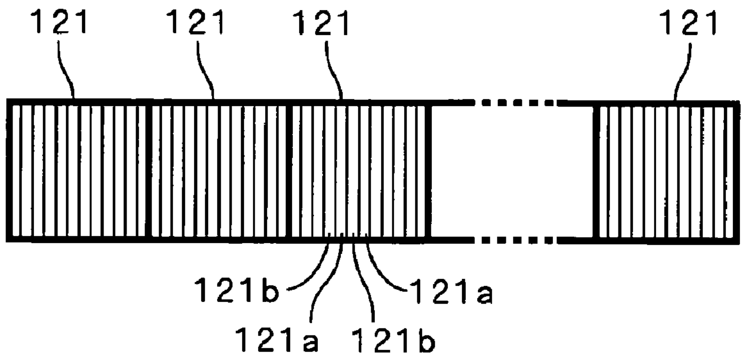
FIG. 3 is an enlarged view of light modulator elements which are arranged.

FIG. 3 is an enlarged view of the light modulator elements 121 which are arranged. The light modulator element 121 is manufactured by using the semiconductor device manufacturing technique, and each light modulator element 121 is a diffraction grating whose grating depth is changed. In each light modulator element 121, a plurality of moving ribbons 121*a* and a plurality of fixed ribbons 121*b* are alternately arranged in parallel, and the moving ribbons 121*a* can vertically move with respect to a base surface therebehind and the fixed ribbons 121*b* are fixed with respect to the base surface. As the diffraction grating type light modulator element, for example, the GLV (Grating Light Valve) (trademarked by Silicon Light Machine, Sunnyvale, Calif.) is well known.

Figure 4A:
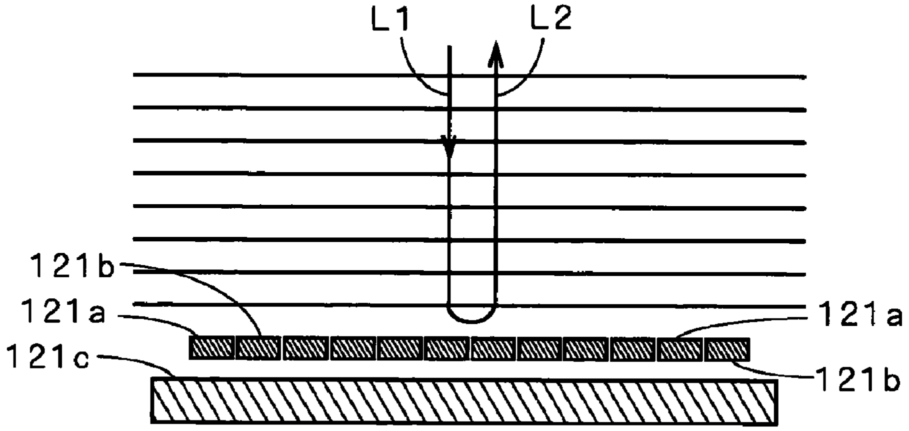
FIGS. 4A and 4B are cross sections of the light modulator element.
Figure 4B:
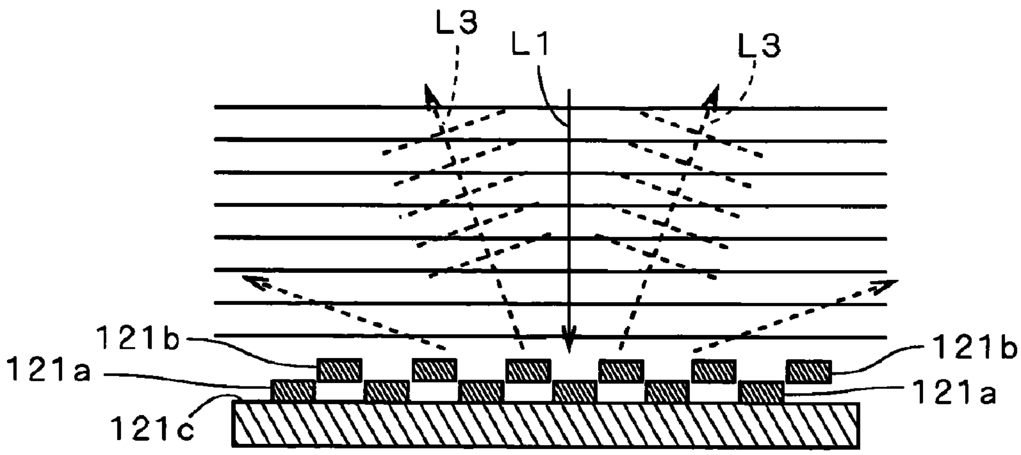

FIGS. 4A and 4B are views each showing a cross section of the light modulator element 121 at a plane perpendicular to the moving ribbons 121*a* and the fixed ribbons 121*b*. As shown in FIG. 4A, when the moving ribbons 121*a* and the fixed ribbons 121*b* are positioned at the same height from a base surface 121*c* (in other words, the moving ribbons 121*a* do not sag), a surface of the light modulator element 121 becomes flush and a reflected light beam of an incident light beam L1 is guided out as a zeroth order light beam L2. On the other hand, as shown in FIG. 4B, when the moving ribbons 121*a* sag towards the base surface 121*c* with respect to the fixed ribbons 121*b*, the moving ribbons 121*a* serve as bottom surfaces of grooves of the diffraction grating, and first order diffracted light beams L3 (further, high-order diffracted light beams) are guided out from the light modulator element 121 and the zeroth order light beam L2 disappears. Thus, each light modulator element 121 performs a light modulation using the diffraction grating.

Figure 5:
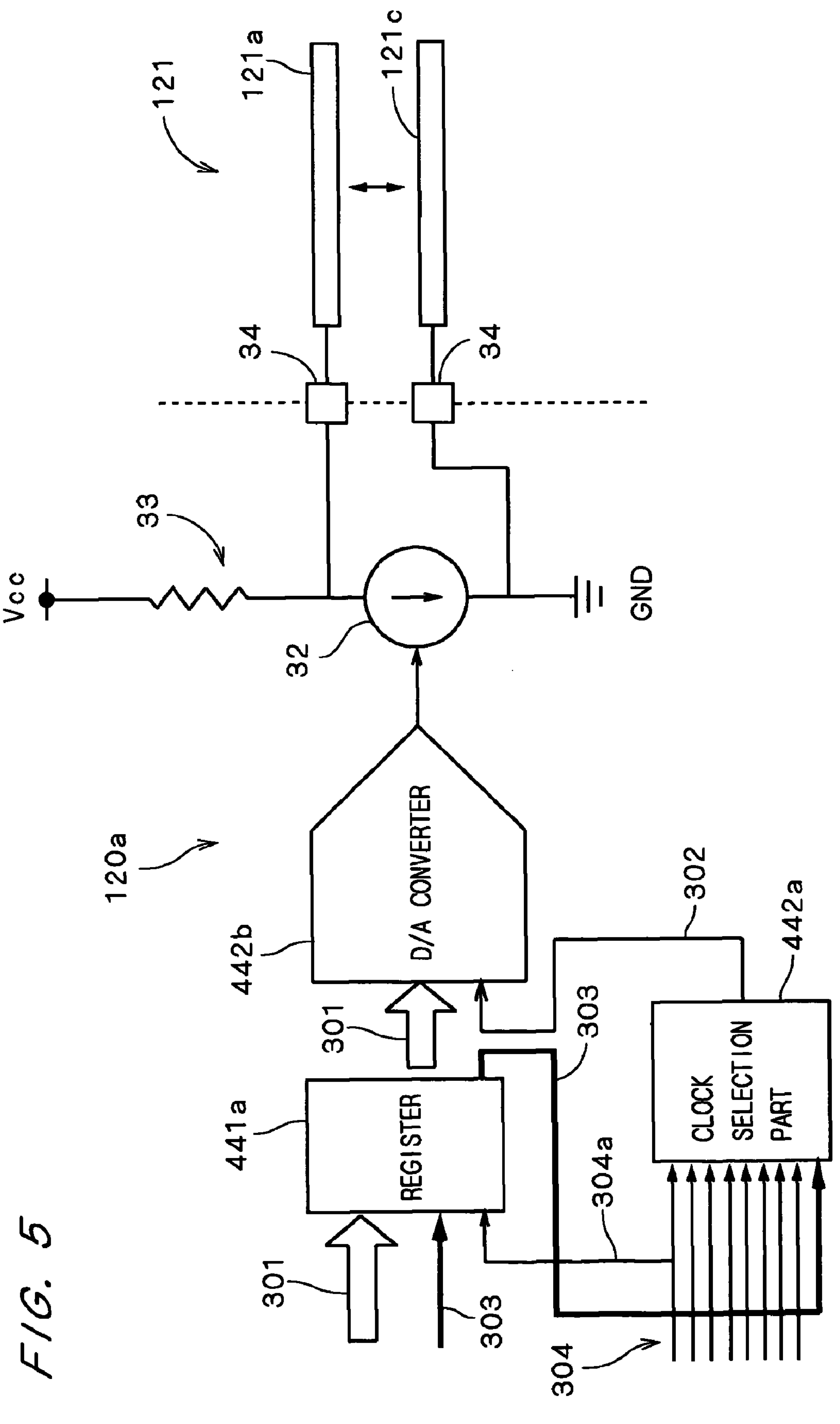
FIG. 5 is a view showing a constitution to drive the light modulator element.

FIG. 5 is a view of a constitution to drive each light modulator element 121, showing an element (hereinafter, referred to as "driving element 120*a*") used for driving operation of the device driving circuit 120. The driving element 120*a* has a register 441*a*, a clock selection part 442*a*, a D/A converter 442*b* and a circuit for converting an output from the D/A converter 442*b* into an actual driving voltage of the light modulator element 121. Driving voltage data 301 representing a target voltage to which the actual driving voltage gradually changes with time and finally reaches (hereinafter, referred to as "target driving voltage") and clock selection data 303 used for controlling a switching timing of the light modulator element 121 are inputted to the register 441*a* and a group of control clocks 304 are inputted to the clock selection part 442*a*. The group of control clocks 304 is a set of control clocks which are sequentially shifted by a very short time and a reference control clock 304*a* which indicates the earliest point of time is also inputted to the register 441*a*.

The clock selection data 303 which is temporarily stored in the register 441*a* is inputted to the clock selection part 442*a* in response to the reference control clock 304*a* (which is inputted antecedently) and one of the group of control clocks 304 is thereby selected. The selected control clock is outputted to the D/A converter 442*b* as an update clock 302.

The driving voltage data 301 is inputted to the D/A converter 442*b* from the register 441*a* and when the update clock 302 is inputted thereto, an analog signal of the driving voltage data 301 is outputted. The driving voltage data 301 for each update clock 302 corresponds to a target driving voltage for one operation of driving the light modulator element 121 and an output from the D/A converter 442*b* is inputted to a current source 32 and further converted into a current therein. One end of the current source 32 is connected to a side of high potential Vcc through a resistance 33 and the other end is grounded.

Both ends of the current source 32 are also connected to the moving ribbons 121*a* of the light modulator element 121 and the base surface 121*c*, respectively, through connecting pads 34. Therefore, when the driving voltage data 301 is converted into the current through the D/A converter 442*b* and the current source 32, it is further converted to an actual driving voltage between both connecting pads 34 by a voltage drop with the resistance 33. Thus, the driving element 120*a* can control (shift) a switching timing of the light modulator element 121 on the basis of the clock selection data 303.

For example, when eight control clocks (referred to as "clock 0", "clock 1", . . . "clock 7" from the earliest control clock) are inputted to the clock selection part 442*a* as shown in FIG. 5, the clock 4 is used as an original switching timing and when it is intended to advance the switching timing, the clock 3, the clock 2, the clock 1 and the clock 0 are used in this order. When it is intended to delay the switching timing, the clock 5, clock 6 and the clock 7 are used in this order.

Here, since the reference control clock 304*a* is generated as a clock used as a reference for switching the light modulator element 121, an operation of inputting the reference control clock 304*a* to the driving element 120*a* in a state where the driving voltage data 301 instructing the ON state is inputted to the register 441*a* corresponds to an operation of inputting an output start signal instructing a light modulator element 121 to start output of signal light into the driving element 120*a* connected to the light modulator element 121, and an operation of inputting the reference control clock 304*a* to the driving element 120*a* in a state where the driving voltage data 301 instructing the OFF state is inputted to the register 441*a* corresponds to an operation of inputting an output stop signal instructing the light modulator element 121 to stop output of signal light into the driving element 120*a*. Then, the clock selection part 442*a* selects one control clock in accordance with a shift time which is obtained in advance and a switching timing of the light modulator element 121 at the time when an output start signal or an output stop signal is inputted to the driving element 120*a* in image recording is shifted. In short, the clock selection part 442*a* is a shift section for substantially shifting a switching timing of the light modulator element 121.

In the above operation, actually, the delay process is appropriately performed for selection of the control clock, however, explanation is simplified for easy understanding. Since there is stray capacitance between the connecting pads 34, the actual driving voltage between the connecting pads 34 changes with the time constant defined between the connecting pads 34 and moves toward the target driving voltage gradually.

Figure 6:
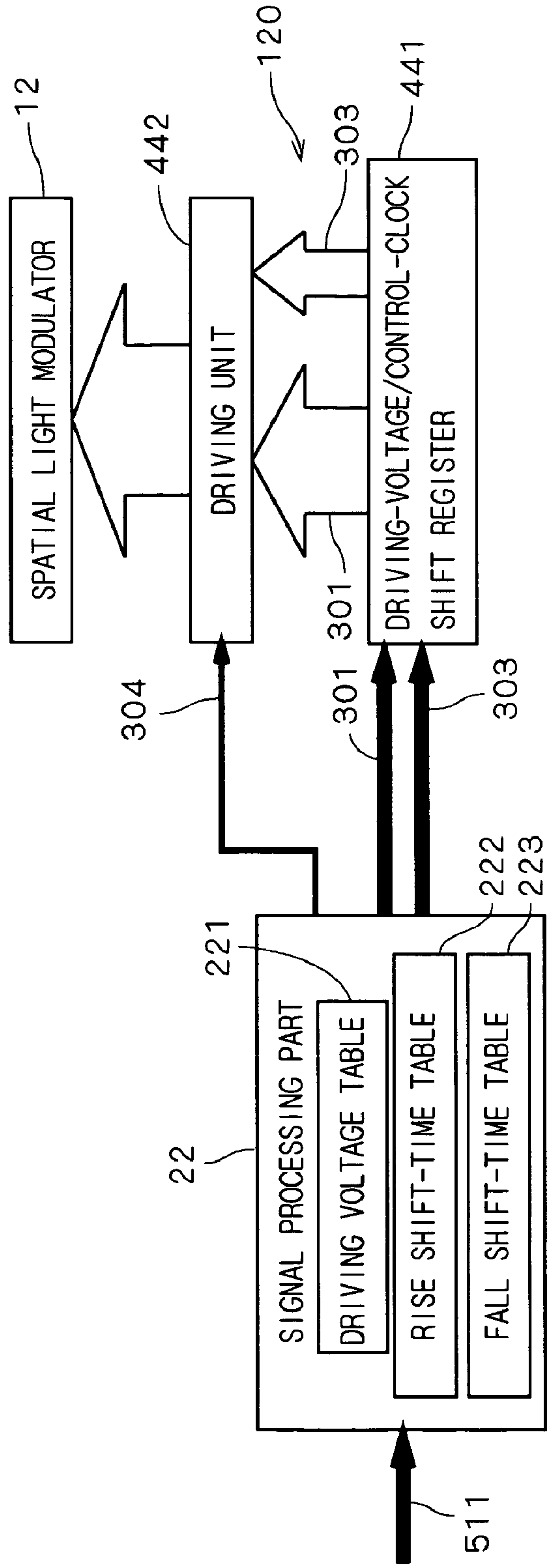
FIG. 6 is a block diagram showing a constitution of a device driving circuit together with a signal processing part and a spatial light modulator.

FIG. 6 is a block diagram showing a constitution of the device driving circuit 120 (see FIG. 2) together with the signal processing part 22 (see FIG. 2) and the spatial light modulator 12. In the signal processing part 22, stored are a driving voltage table 221 representing the target driving voltage to be instructed to the driving element 120*a* of each light modulator element 121 in the ON state, a rise shift-time table 222 representing the shift time of switching timing at the time when each light modulator element 121 changes from the OFF state to the ON state, and a fall shift-time table 223 representing the shift time of switching timing at the time when each light modulator element 121 changes from the ON state to the OFF state. These tables are generated by the corrected light amount determining part 241 and the shift-time determining part 242 of FIG. 1 in advance according to a later-discussed method and stored in the memory 243, and they are read out from the memory 243 and thereby prepared in the signal processing part 22.

The device driving circuit 120 has a driving-voltage/control-clock shift register 441 which sequentially stores data outputted from the signal processing part 22 and a driving unit 442. The driving-voltage/control-clock shift register 441 is an array of registers 441*a* shown in FIG. 5 and the driving unit 442 is an array of the clock selection parts 442*a* and the D/A converters 442*b*.

An image signal 511 representing an image is sequentially inputted from the signal generation part 23 (see FIG. 1) to the signal processing part 22 as a binary signal instructing each light modulator element 121 to perform writing or not to perform writing. The driving voltage data 301 applied to the driving element 120*a* of each light modulator element 121 is generated on the basis of the image signal 511 and the driving voltage table 221. In parallel with this operation, the clock selection data 303 is sequentially generated on the basis of the image signal 511 and the rise shift-time table 222 or the fall shift-time table 223. Also, a group of control clocks 304 is generated in the signal processing part 22 in accordance with clocks inputted from the outside shown in FIG. 5 and the group of control clocks 304 is inputted to the driving unit 442.

The driving voltage data 301 and the clock selection data 303 are sequentially stored into the driving-voltage/control-clock shift register 441 in synchronization with a predetermined clock signal. The operation up to this point is a serial process, but when the driving voltage data 301 and the clock selection data 303 as many as the light modulator elements 121 are stored into the driving-voltage/control-clock shift register 441, these data are transmitted to the driving unit 442 in response to the reference control clock 304*a*, as discussed with reference to FIG. 5, and then the control clock is selected out of the group of control clocks 304 in accordance with the clock selection data 303 and an actual driving voltage in accordance with the driving voltage data 301 is applied to each light modulator element 121 at the timing of the selected control clock (an update clock 302).

With this operation, the rise timing (the timing of switching from the OFF state to the ON state) of the light modulator element 121 is shifted by the shift time for rising related to the above light modulator element 121 from the original switching timing (the timing of the clock 4 above discussed) and the fall timing (the timing of switching from the ON state to the OFF state) is also shifted by the shift time for falling. In cases where the light modulator element 121 changes from the ON state to the ON state and changes from the OFF state to the OFF state (i.e., switching is not performed at switching timing), since the operation is not affected by any selected control clock, distinction between rising and falling of the light modulator element 121 is not detected in the signal processing part 22. Therefore, when the image signal 511 indicates the ON state, the shift time is simply selected from the rise shift-time table 222 and when the image signal 511 indicates the OFF state, the shift time is simply selected from the fall shift-time table 223.

Figure 7:
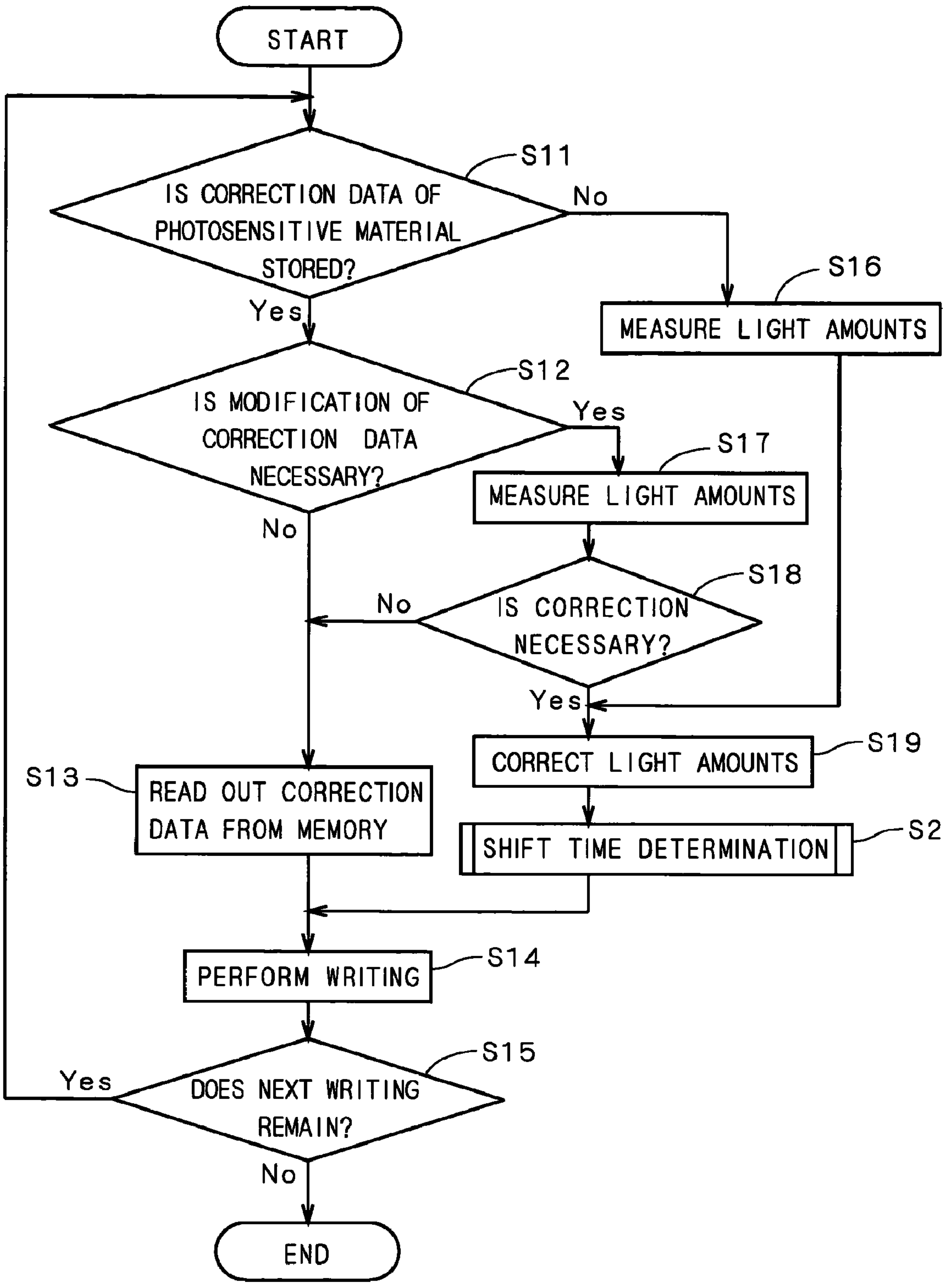
FIG. 7 is a flowchart showing an operation flow of the image recording apparatus.

FIG. 7 is a flowchart showing an operation flow of the image recording apparatus 1. When recording of an image, that is, writing is performed on the recording medium 9 in the image recording apparatus 1, first, it is checked whether or not correction data for a photosensitive material used for the recording medium 9 is stored in the memory 243 of the calculation part 24 (Step S11). The correction data are the driving voltage table 221, the rise shift-time table 222, and the fall shift-time table 223 which are discussed above. When the correction data is stored, it is checked whether it is necessary to confirm modification of the correction data (Step S12). For example, in a case where there is a possibility of change in a state of the image recording apparatus 1, such as a case where a predetermined time has passed from when modification of the correction data or its confirmation is previously performed or a case where a predetermined number of times of writings are performed from modification of the correction data, it is checked whether modification of the correction data is necessary. When it is assumed that the state of the image recording apparatus 1 does not change, it is determined that confirmation of modification of the correction data is unnecessary.

In a case where confirmation of modification of the correction data is unnecessary, the correction data is read out from the memory 243 of FIG. 1 to the signal processing part 22 of FIG. 6 as necessary and the driving voltage table 221, the rise shift-time table 222 and the fall shift-time table 223 are prepared in the signal processing part 22 (Step S13). Subsequently, correction of light amounts in accordance with the driving voltage table 221 and shifts of switching timing at the rise and the fall in accordance with the rise shift-time table 222 and the fall shift-time table 223 are performed by the general control part 21 and the signal processing part 22 (especially, the clock selection part 442*a*), whereby writing is performed (Step S14).

Specifically, the recording medium 9 moves relatively to the plurality of light modulator elements 121 at a constant speed in a direction perpendicular to an arrangement direction of positions irradiated with light from the light modulator elements 121 by rotating the holding drum 70, while outputting signal lights from the plurality of light modulator elements 121, and correction of light amounts and shifts of switching timing are performed in parallel with irradiation. Then, in synchronization with rotation of the holding drum 70, the optical head 10 moves in the sub scan direction, to record an image on the whole recording medium 9. The moving direction (main scan direction) of the outer surface of the holding drum 70, that is, the moving direction of the recording medium 9, is not limited to be perpendicular to the arrangement direction of positions irradiated with light but may be a direction crossing the arrangement direction.

In other words, it is also possible that a direction crossing the arrangement direction of the irradiation positions at an angle other than 90 degrees is defined as the main scan direction and a direction perpendicular to the main scan direction is defined as the sub scan direction. In this case, the image signal 511 applied to each light modulator element 121 is controlled to delay appropriately so as to compensate variation in positions with respect to the main scan direction of each light modulator element 121, to perform the same image recording as a case where the arrangement direction of the irradiation positions is parallel to the sub scan direction. With respect to this control method, known are techniques disclosed in Japanese Patent Application Laid Open Gazette No. 6-91928 or Japanese Patent Application Laid Open Gazette No. 6-316106, or the like, and the disclosures of which are herein incorporated by reference. As disclosed in these documents, the main scan direction may be largely tilted with respect to a direction perpendicular to arrangement direction of irradiation positions, and the main scan direction and the direction perpendicular to the arrangement direction of irradiation positions have only to be different directions.

When recording of the next image is performed after recording of an image on the recording medium 9 is complete, the recording medium 9 on the holding drum 70 is exchanged for a new one, and the operation goes back to Step S11 (Step S15).

In a case where a photosensitive material on the recording medium 9 has not been used in the past and the correction data for the photosensitive material is not stored in the memory 243 in recording of an image, first, the optical head 10 moves up to a position opposed to the detection part 71 as indicated by double-dashed lines in FIG. 1, a light amount of signal light from each light modulator element 121 is measured (Step S16), and the driving voltage table 221 is obtained. Thereafter, unevenness in light amounts is corrected (Step S19), shift times of switching timing at the rise and the fall of respective light modulator elements 121 are obtained as the rise shift-time table 222 and the fall shift-time table 223 by using the detection part 71 (Step S2), and then writing (i.e., image recording) is performed (Step S14).

On the other hand, in another case where the correction data for the photosensitive material is stored in the memory 243 and it is determined in Step S12 that confirmation of modification of the correction data is necessary, measurement of light amounts is performed like in Step S16 (Step S17), and it is checked if the light amount from each light modulator element 121 falls within tolerance (Step S18). When the light amounts fall within tolerance, the process goes to reading out the correction data in Step S13 and when those do not fall within tolerance, the above-discussed correction of light amounts and determination of shift times are performed (Steps S19, S2) and then recording of image is performed (Step S14).

Figure 8:
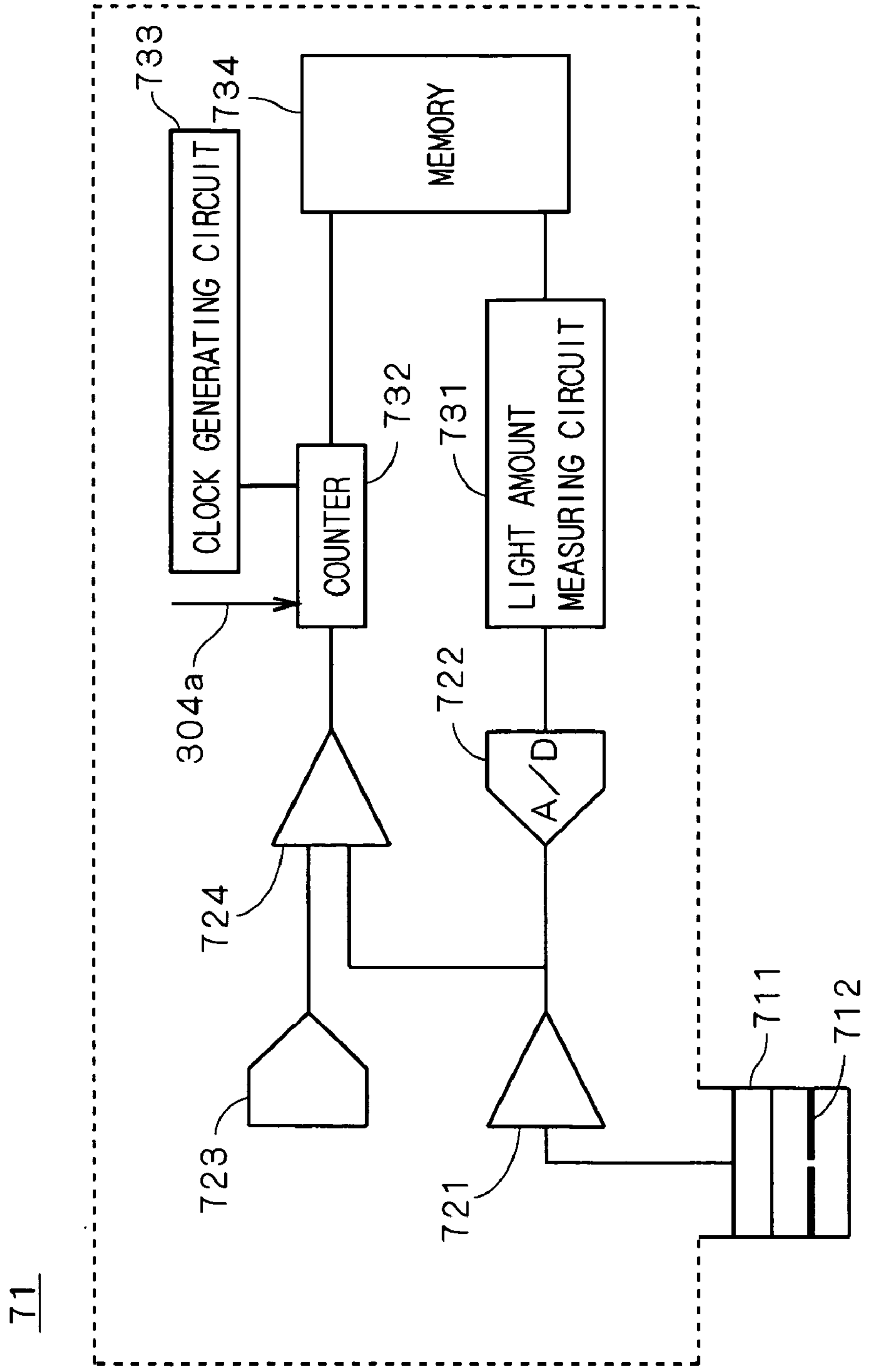
FIG. 8 is a block diagram showing a construction of a detection part.

FIG. 8 is a block diagram showing a construction of the detection part 71. The detection part 71 comprises a photosensor 711 which is a photodetector for converting light from the optical head 10 into an electrical analog signal, and a slit 712 opposed to the optical head 10 is located by the side of the photosensor 711. The photosensor 711 is connected to an amplifier 721 and the amplifier 721 is connected to an A/D converter 722, a light amount measuring circuit 731 and a memory 734 in this order. The amplifier 721 is also connected to a comparator 724 and a reference voltage from a reference voltage generating circuit 723 is inputted in the comparator 724. The comparator 724 compares the reference voltage and output from the amplifier 721 (i.e., output from the photosensor 711) and a comparison result is inputted to a counter 732. Sampling clocks generated in a clock generating circuit 733 are inputted to the counter 732 and the reference control clock 304*a* (see FIG. 5) serving as the output start signal and the output stop signal which are discussed above is also inputted to the counter 732. A count number at the counter 732 can be stored in the memory 734.

Figure 9:
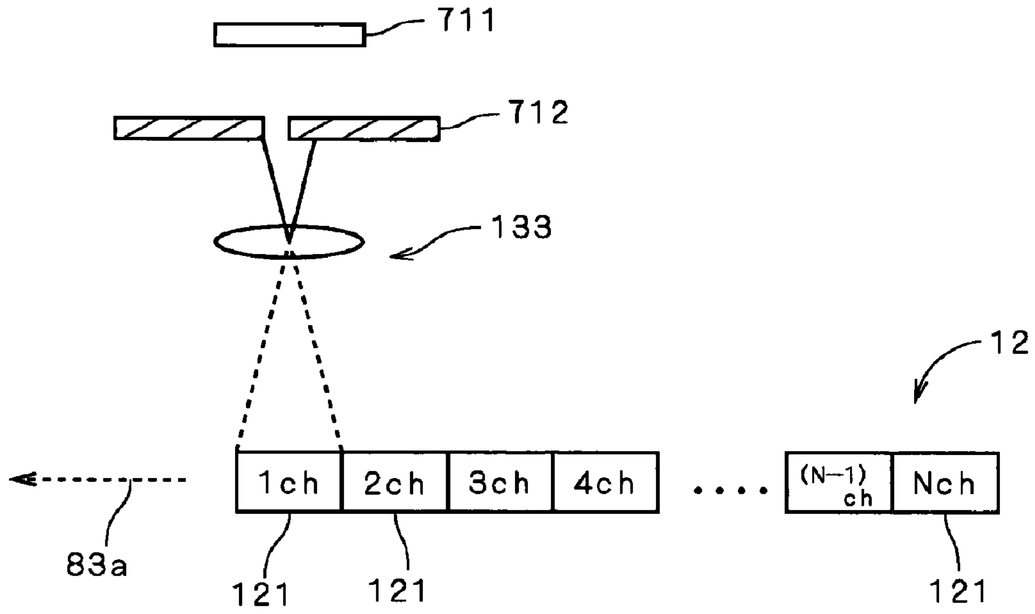
FIG. 9 is a view showing an operation in measurement of light amount.
Figure 10:
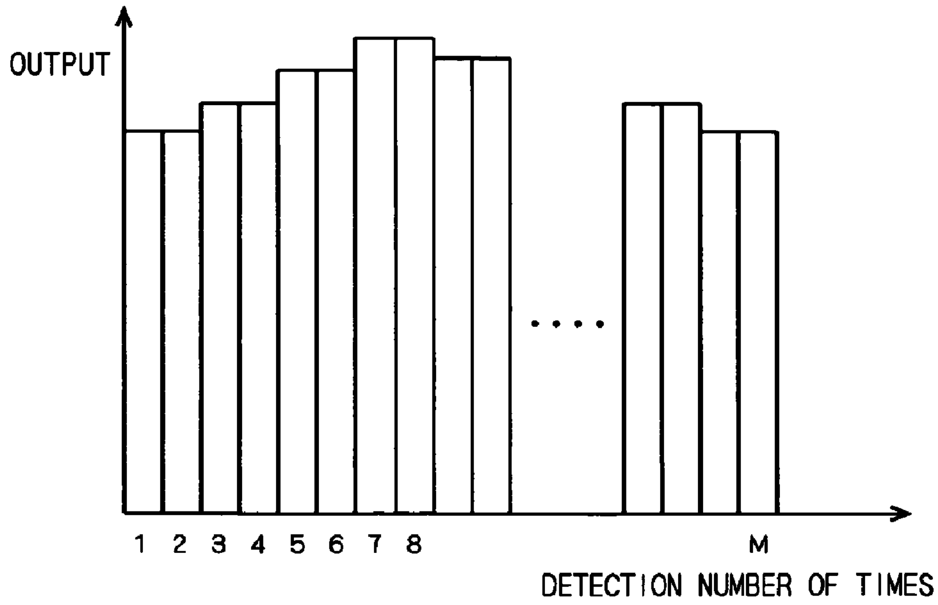
FIG. 10 is a graph showing an output distribution of a photosensor.

FIG. 9 is a view showing an operation of the image recording apparatus 1 in measurement of light amounts in Step S16 of FIG. 7. In measurement of light amounts, the slit 712 is located at a position between the photosensor 711 and the spatial light modulator 12 and the position is conjugate with the plurality of light modulator elements 121 through the zoom lens 133 and the like (i.e., spot images of the light modulator elements 121 are formed at the position). After all light modulator elements 121 are brought into the ON state, the optical head 10 moves relatively to the slit 712 in a direction indicated by an arrow 83*a* (which is a direction corresponding to the arrangement direction of the light modulator elements 121 and is the sub scan direction in writing). In other words, the motor 82 and the ball screw 83 which are shown in FIG. 1 function as a slit moving mechanism for moving the slit 712 relatively to the light modulator elements 121. A width (exactly, width in the sub scan direction) of a clearance which is formed in the slit 712 is made half of a width in the sub scan direction of a spot image of one light modulator element 121 (the width of the clearance is not limited to be half of a spot image but may be narrower than the width of the spot image). While the optical head 10 moves by a width of a spot image of one light modulator element 121, the A/D converter 722 detects output from the photosensor 711 twice. With this operation, an output distribution illustrated in FIG. 10 is obtained. In FIG. 10, detection number of times of 1 and 2 represent output obtained from the first light modulator element 121, detection number of times of 3 and 4 represent output obtained from the second light modulator element 121, and detection number of times of (M−1) and M represent output obtained from the N-th light modulator element 121 (M is a value twice N).

Figure 11:
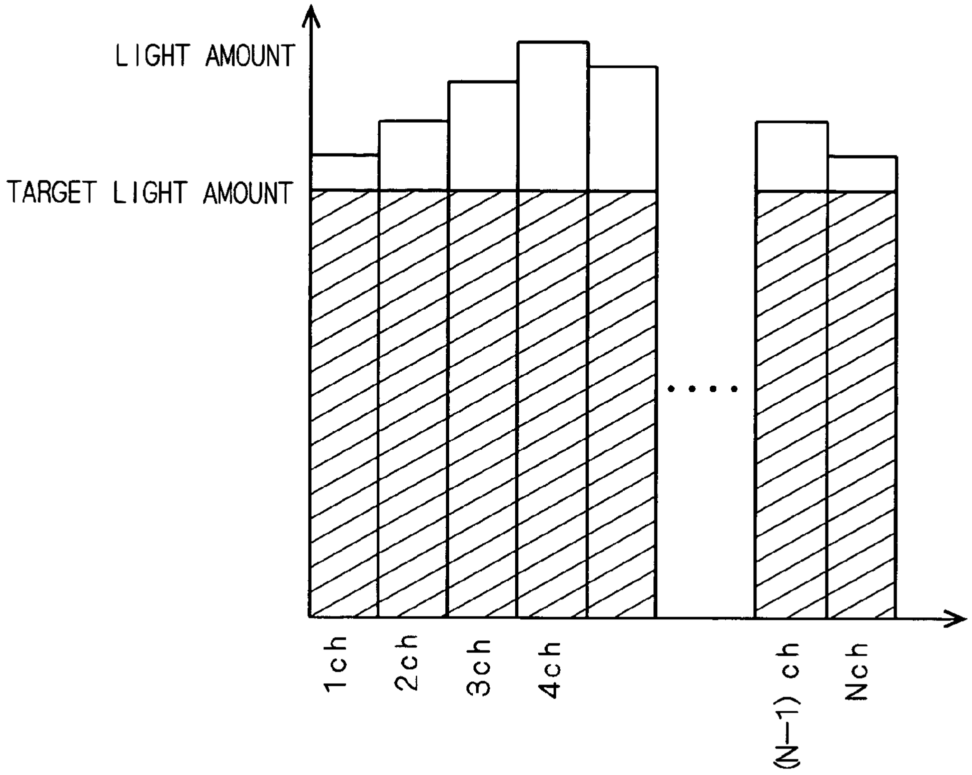
FIG. 11 is a graph showing a result of measurement of light amounts.

In the light amount measuring circuit 731 of FIG. 8, an average of two outputs illustrated in FIG. 10 is obtained and further converted into a light amount from each light modulator element 121, and a light amount in each number of the light modulator elements 121 (hereinafter, the number is referred to as "channel (ch)") is obtained as shown in FIG. 11. The obtained light amount in each channel is stored in the memory 734 for a while, and thereafter it is transmitted to the memory 243 of the calculation part 24 shown in FIG. 1.

In Step S19 after measurement of light amounts in FIG. 7, the corrected light amount determining part 241 of the calculation part 24 determines a value smaller than the minimum one out of light amounts from the light modulator elements 121 as a target light amount shown in FIG. 11 and obtains the target driving voltages where the light amounts from respective light modulator elements 121 become the target light amount. In other words, in the light modulator element 121, as shown in FIG. 4A, though the heights of the moving ribbons 121*a* and the fixed ribbons 121*b* from the base surface 121*c* are made equal and the zeroth order light beam is obtained as a signal light, it is possible to decrease a light amount of signal light by making the height of the moving ribbons 121*a* slightly lower than that of the fixed ribbons 121*b* and with this property, the light mount from each light modulator element 121 is controlled to be the target light amount. In FIGS. 10 and 11, it is premised that sizes of spot of light from light modulator elements 121 are constant, however, when the sizes of spot are uneven, a mechanism for detecting a size of spot is provided in the detection part 71 and on the basis of the size of spot and a light amount applied to the whole spot, a light amount required for writing a point with a predetermined width onto the recording medium 9 is obtained as the target light amount.

Figure 12:
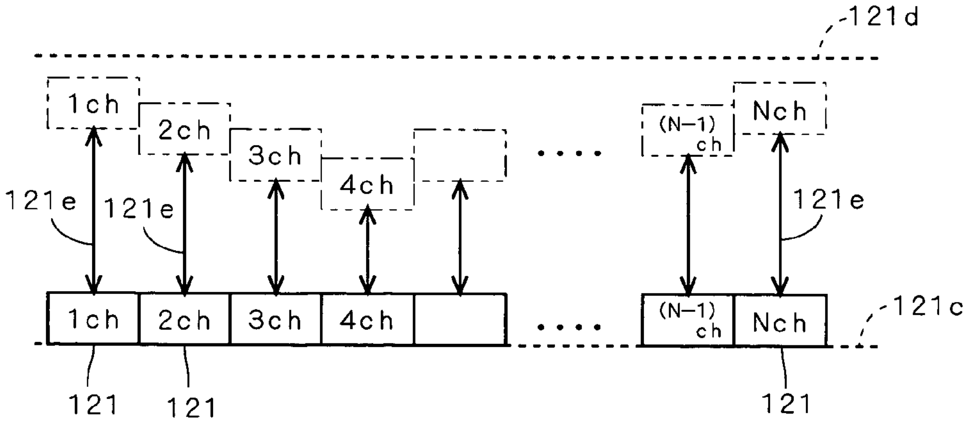
FIG. 12 is a view showing a state where light amount from each light modulator element is controlled.

FIG. 12 is a view showing a state where the light amount from each light modulator element 121 is controlled. In FIG. 12, each box in which a channel number is written represents the height of the moving ribbons 121*a* from the base surface 121*c* in the light modulator element 121, and solid-line boxes show the heights of the moving ribbons 121*a* at the time when signal lights are not emitted and two-dot chain line boxes show the heights of the moving ribbons 121*a* at the time when signal lights are emitted. A reference sign 121*d* shows the height of upper surfaces of the fixed ribbons 121*b* from the base surface 121*c*. As shown in FIG. 12, by controlling the height of the moving ribbons 121*a* at the time when signal light is emitted, the light amount from each light modulator element 121 is corrected to the target light amount. The target driving voltages applied to all light modulator elements 121 after correction are stored in the memory 243 as the driving voltage table 221.

Figure 13:
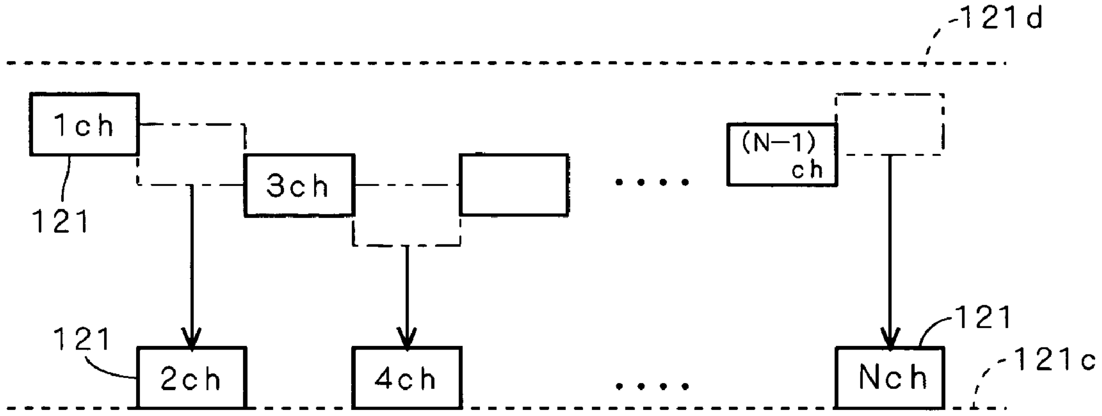
FIG. 13 is a view showing the spatial light modulator at the time when an image of vertical 1-dot-on and 1-dot-off lines is written.
Figure 14:
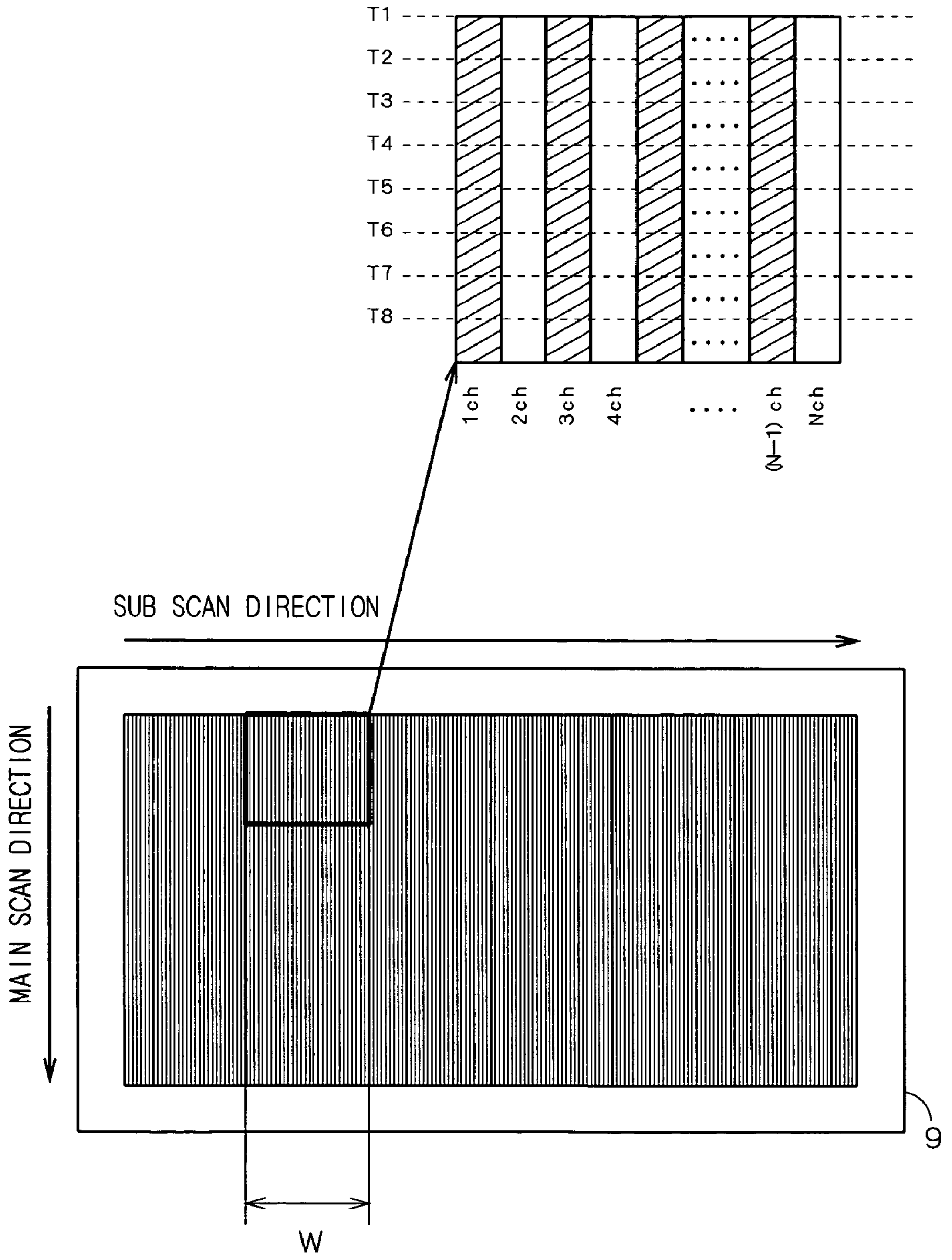
FIG. 14 is a schematic view showing the image of vertical 1-dot-on and 1-dot-off lines.

Through the above correction of light amounts, for example, as shown in FIG. 13, when writing is performed with the light modulator elements 121 alternately kept in the ON state and in the OFF state, scanned lines of ON in the main scan direction (lines recorded as a visible image) and scanned lines of OFF in the main scan direction (lines recorded as an invisible image) are alternately recorded in the sub scan direction on the recording medium 9 such as a printing plate or the like. FIG. 14 is a schematic view showing the whole pattern written on the recording medium 9 and a partially enlarged written pattern (one swath, i.e., an exposure region with a width W in the sub scan direction scanned by the optical head 10 through one path). As shown in FIG. 14, when writing is performed with the light modulator elements 121 alternately kept in the ON state and in the OFF state, a plurality of lines extending in the main scan direction (vertical direction) in response to the light modulator elements 121 of ON state are written. Hereinafter, the above pattern written on the recording medium is referred to as an image of vertical 1-dot-on and 1-dot-off lines, and width of these lines are the same. Though the swaths are partitioned by thick lines in FIG. 14, these patterns do not appear in the actual writing (the same is true in FIG. 15). Preferably, the target light amount is set so that each width of line and each width of space (between lines) are made equal in FIG. 14. T1 to T8 shown in FIG. 14 represent time points when the reference control clocks 304*a* are inputted to the device driving circuit 120, respectively.

As shown in FIG. 12, in a case where the heights of the moving ribbons 121*a* are uneven in light modulator elements 121, even if signals instructing switching from the OFF state to the ON state are simultaneously inputted to the driving elements 120*a* connected to light modulator elements 121, since the moving distances of the moving ribbons 121*a* are uneven in light modulator elements 121 as shown by arrows 121*e*, the transition times from the OFF state to the ON state are uneven (i.e., different from one another). Also in the switching from the ON state to the OFF state, the same unevenness occurs. Since the light modulator element 121 of diffraction grating type is an analogue element of mechanical operation, not only correction of light amount but also other conditions such as temperature or errors in manufacturing can cause unevenness.

As a result, when a signal which changes between the ON state and the OFF state in each reference control clock 304*a* is simultaneously inputted to each light modulator element and lines extending in the sub scan direction (hereinafter, referred to as "image of horizontal 1-dot-on and 1-dot-off lines") are written, the width of each line is not constant as shown in FIG.

Figure 15:
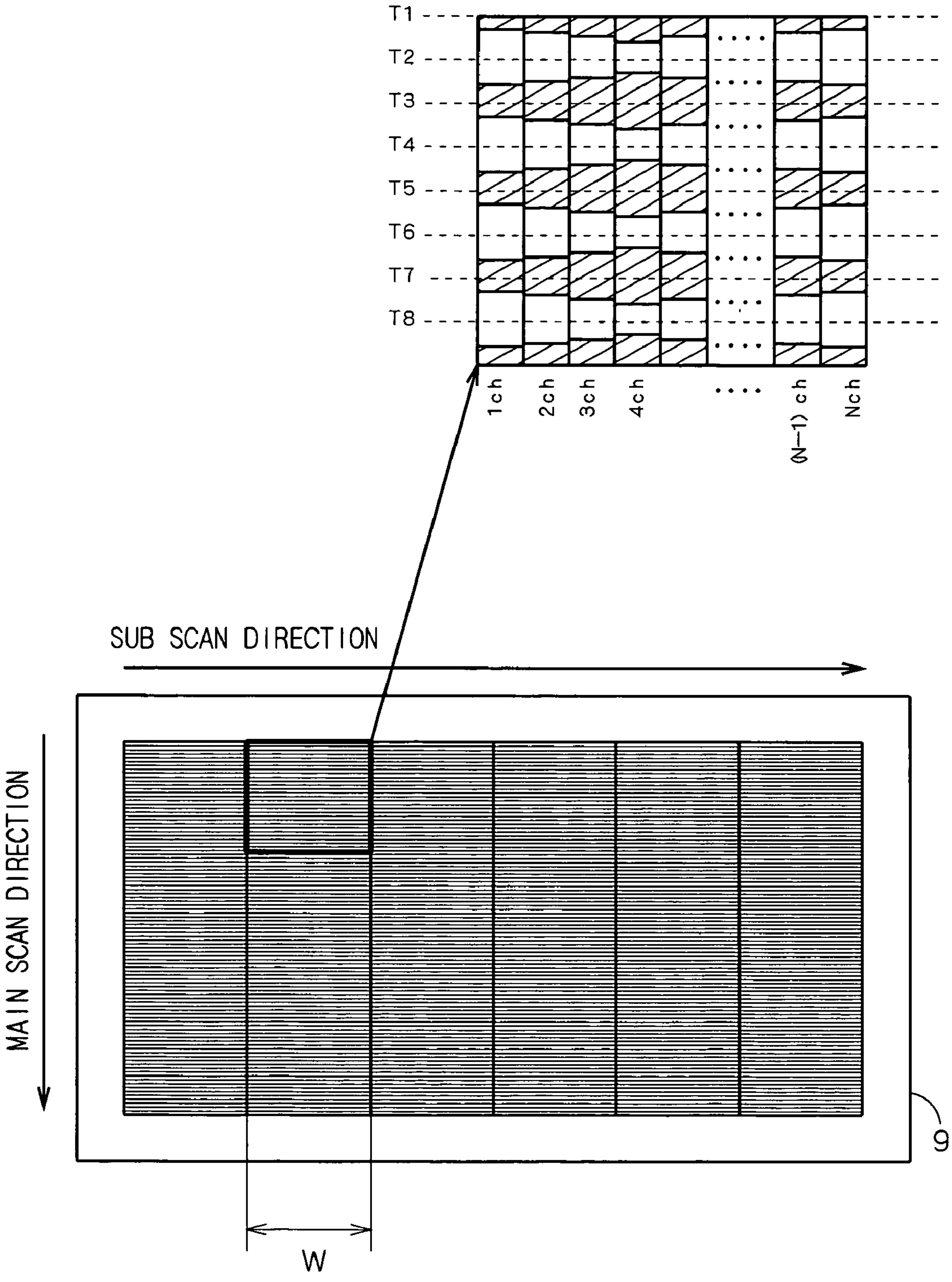
FIG. 15 is a schematic view showing an image of horizontal 1-dot-on and 1-dot-off lines.

15. Therefore, as shown in FIG. 7, after correction of light amounts, the operation for obtaining the rise shift-time table 222 and the fall shift-time table 223 above discussed is performed (Steps S19, S2). FIG. 15 shows the whole written pattern and its partially enlarged written pattern like in FIG. 14.

Figure 16:
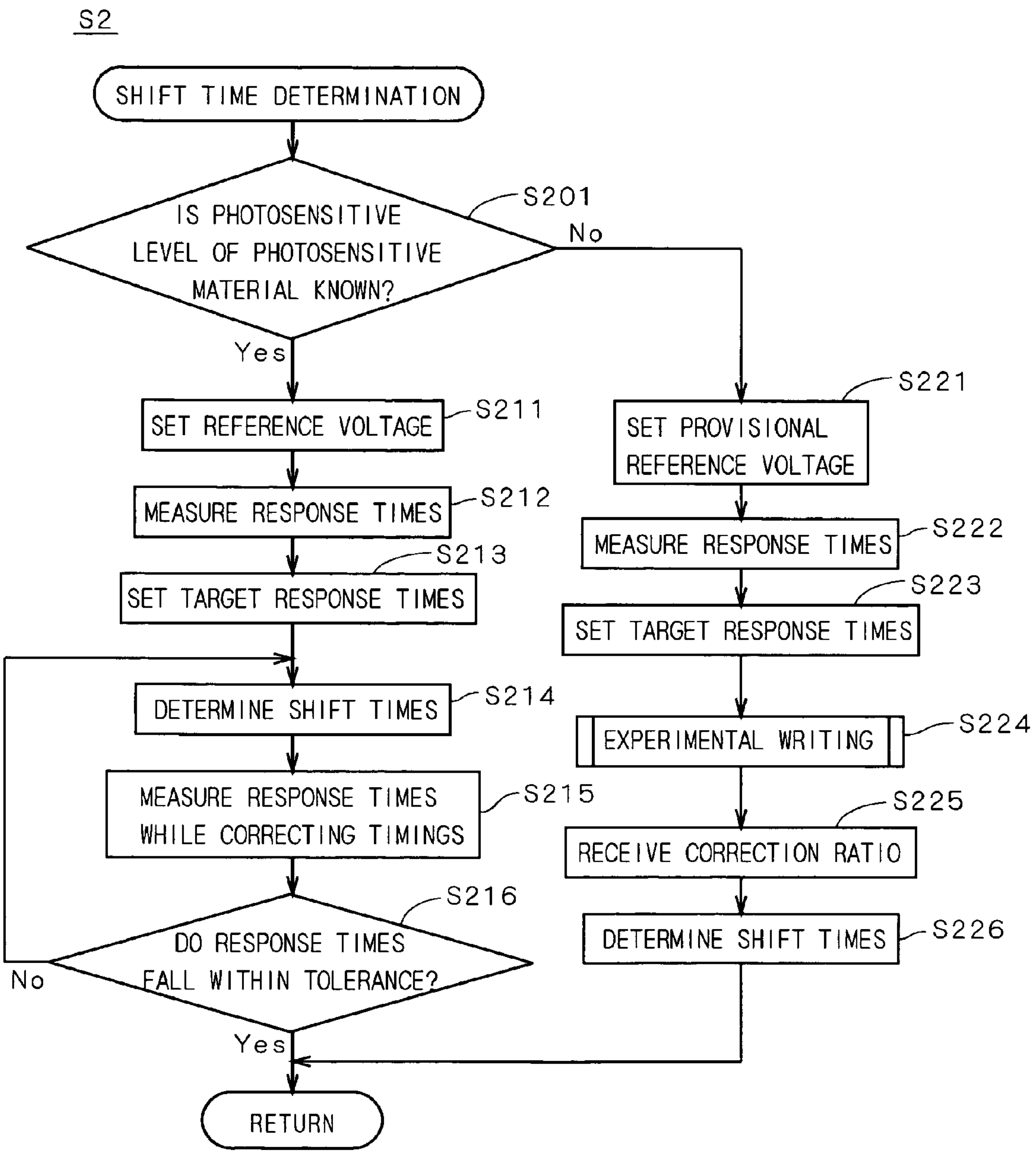
FIG. 16 is a flowchart showing an operation flow for determining shift times.

Next discussion will be made on determining shift times of switching timings of each light modulator element 121 (Step S2). FIG. 16 is a flowchart showing an operation flow for determining shift times. In this operation, first, it is checked whether or not a photosensitive level of the photosensitive material used for the recording medium 9 is known (Step S201), and thereafter different steps are performed whether it is known or not.

Figure 17:
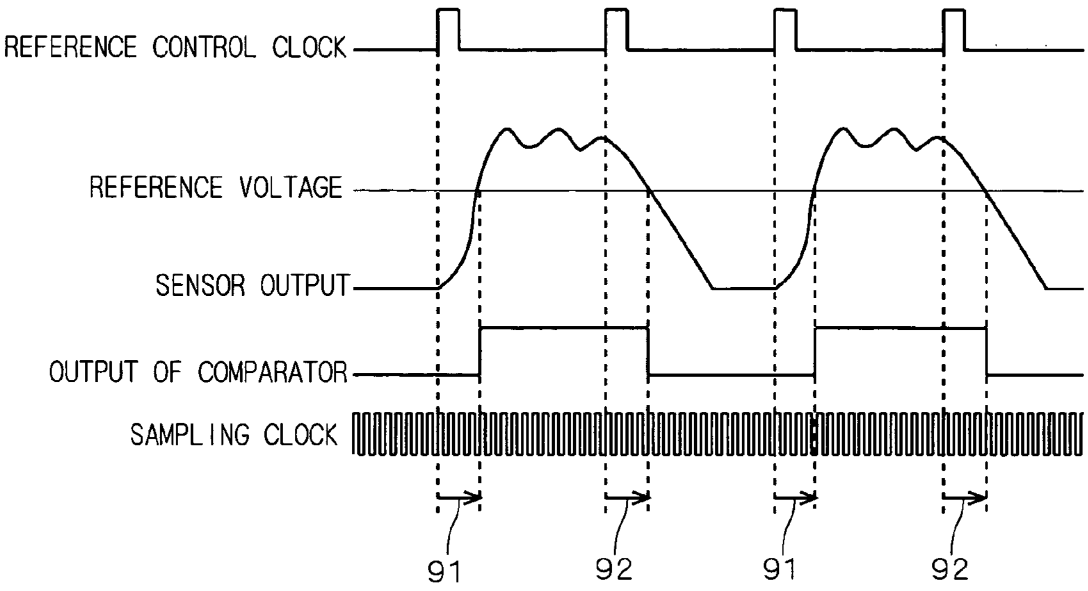
FIG. 17 is a view showing an output of the photosensor and an output of a comparator.

When the photosensitive level of the photosensitive material is known, the reference voltage generated in the reference voltage generating circuit 723 shown in FIG. 8 is set in accordance with the photosensitive level (Step S211). FIG. 17 is a view showing a sensor output from the photosensor 711 and an output of the comparator 724 while the light modulator element 121 changes between the ON state and the OFF state every time when the reference control clock 304*a* is inputted to the driving element 120*a*. Though sensor output starts up just after input of the reference control clock 304*a* in FIG. 17, as described with reference to FIG. 5, actually, when the shift time is 0, since voltage is applied to the light modulator element 121 in accordance with a control clock of the central timing out of the group of control clocks 304, rise of sensor output is accurately started after passage of very small time from input of the reference control clock 304*a*.

In writing, the light amount from the light modulator element 121 increases according to input of the reference control clock 304*a* and photosensing of the photosensitive material is started at a time when the light amount is above the photosensitive level. Start of actual photosensing depends on not only type of photosensitive material but also scan speed of the recording medium 9 and spot diameter of light from the light modulator element 121, and also depends on width of line and density of line which is to be written. The reference voltage is set on the basis of the known photosensitive level so as to become a voltage of sensor output which is obtained assuming that light from the light modulator element 121 at starting of the photosensing is inputted to the photosensor 711. Also, the reference voltage is a voltage which is obtained assuming that light from the light modulator element 121 is inputted to the photosensor 711 at a time when the light amount is below the photosensitive level. Therefore, in FIG. 17, a period where output from the comparator 724 is 1 corresponds to a period where the photosensitive material is photosensed.

After setting the reference voltage, next, measured are a rise time in changing the light modulator element 121 from the OFF state to the ON state and a fall time in changing the light modulator element 121 from the ON state to the OFF state (hereinafter, "rise time" and "fall time" are collectively referred to as "response times") (Step S212). In FIG. 17, a period indicated by an arrow 91 is the rise time and it is a period from input of the reference control clock 304*a* to the driving element 120*a*, that is, from input of output start signal instructing start of output of signal light to the driving element 120*a* to when the comparator 724 detects that output from the photosensor 711 is above the reference voltage and the output of the comparator 724 becomes 1. A period indicated by an arrow 92 is the fall time and it is a period from input of the reference control clock 304*a* to the driving element 120*a*, that is, from input of output stop signal instructing stop of output of signal light to the driving element 120*a* to when the comparator 724 detects that output from the photosensor 711 is below the reference voltage and the output of the comparator 724 becomes 0. The counter 732 shown in FIG. 8 measures a response time by counting the sampling clocks from the clock generating circuit 733 on the basis of the reference control clock 304*a* and the output from the comparator 724. The measured response times are stored in the memory 734 and further transmitted to the memory 243 of the calculation part 24 shown in FIG. 1.

Figure 18:
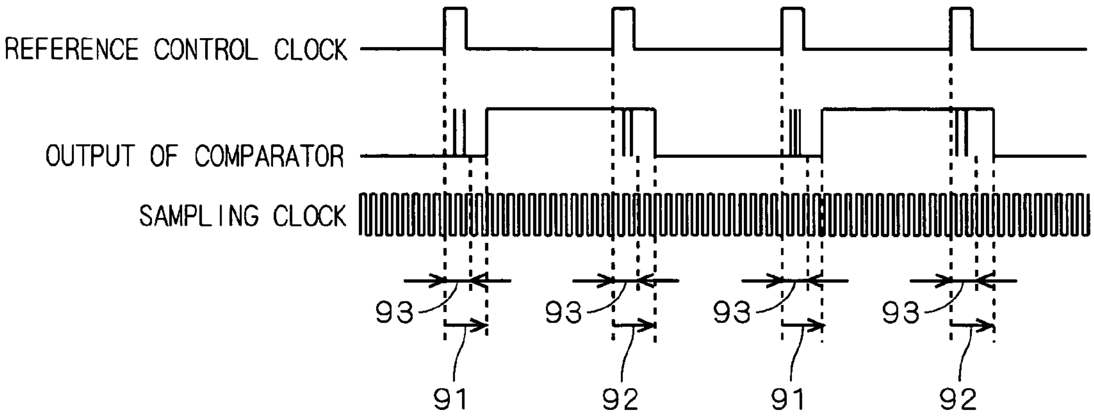
FIG. 18 is a view showing noises from the comparator.

Since the moving ribbons 121*a* of the light modulator element 121 oscillate, when the state of the light modulator element 121 changes (especially, changes from the OFF state to the ON state), the output from the photosensor 711 oscillates as shown in FIG. 17 and consequently, as shown in FIG. 18, there is a case where noises occur in the output from the comparator 724. This phenomenon emerges when an element mechanically modulating light is used as the light modulator element. Therefore, output from the comparator 724 is ignored in the detection part 71 during a predetermined period of time after input of the reference control clock 304*a* (i.e., output start signal and output stop signal) to the driving element 120*a* shown by a reference sign 93. With this operation, the rise time 91 and the fall time 92 are accurately measured.

Figure 19:
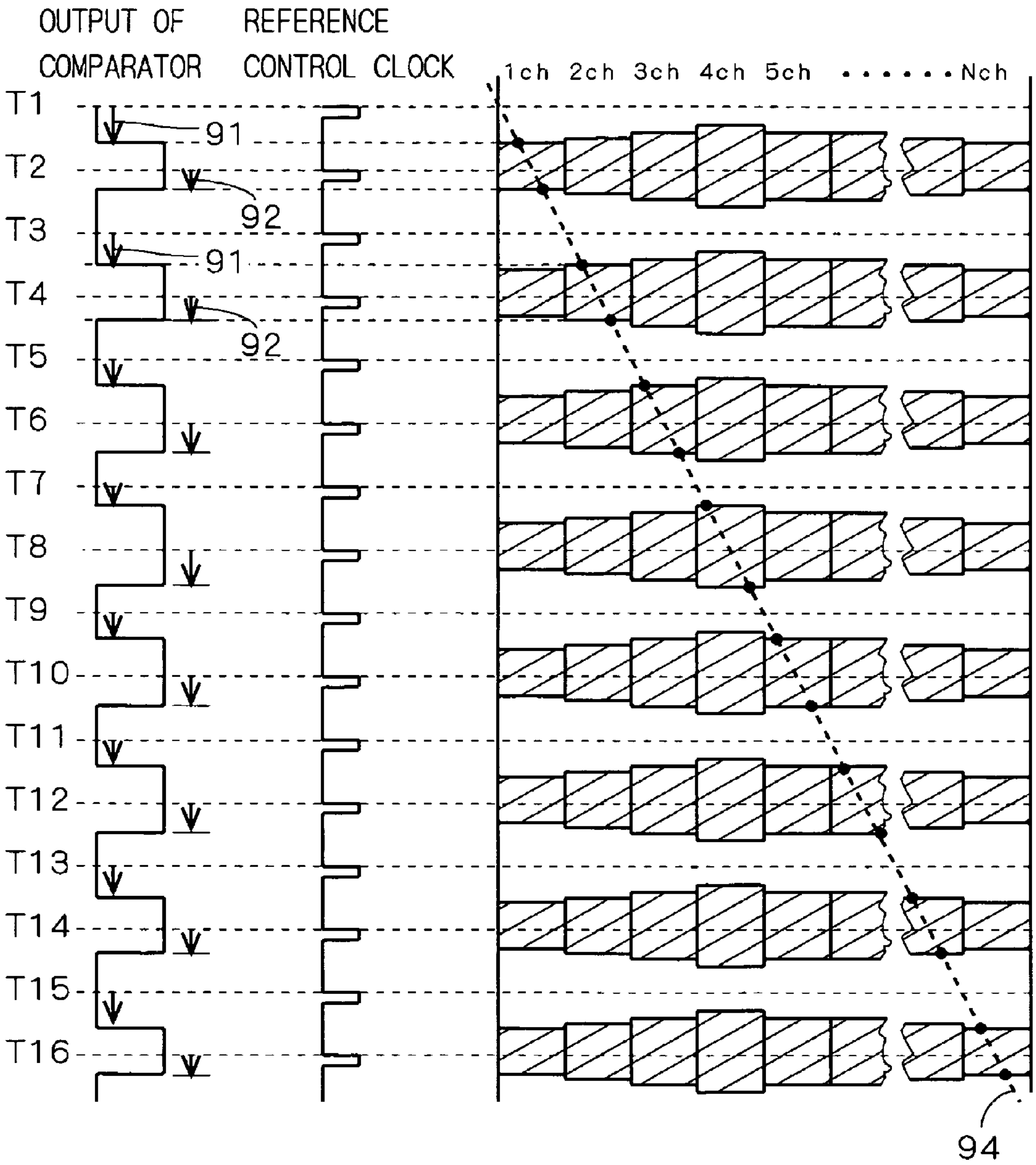
FIG. 19 is a view showing acquisition of response times of light modulator elements and writing of the image of horizontal 1-dot-on and 1-dot-off lines arranged side by side.

In the actual measurement of response times, the optical head 10 moves in the sub scan direction while all light modulator elements 121 are simultaneously changed between the ON state and the OFF state in accordance with the reference control clock 304*a*, whereby response times of all light modulator elements 121 are sequentially measured. FIG. 19 is a view showing acquisition of response times of each light modulator element 121 and writing of image of horizontal 1-dot-on and 1-dot-off lines arranged side by side. In FIG. 19, time passes toward lower side, reference signs T1 to T16 represent input time of the reference control clock 304*a* to the driving element 120*a* and in the output of the comparator 724 and the waveform of the reference control clocks 304*a*, the right side is 1.

The right part of FIG. 19 shows a state where an image of horizontal 1-dot-on and 1-dot-off lines is written in accordance with the reference control clock 304*a*, each hatched period is a period of writing the photosensitive material and also corresponds to a period when output from the comparator 724 is 1. An oblique line indicated by a reference sign 94 represents a position of the slit 712 moving according to passage of time. Specifically, in acquisition of the rise time and fall time, the optical head 10 moves so that a spot image of one light modulator element 121 moves on the slit 712 during one cycle of ON-OFF operation of the light modulator element 121. As a result, it becomes possible to sequentially measure the rise time 91 and the fall time 92 of each light modulator element 121 together with movement of the slit 712. A spot image of one light modulator element 121 may move on the slit 712 during two cycles of ON-OFF operation of the light modulator element 121 by moving the optical head 10 more slowly. In this case, an average of a plurality of rise times obtained with respect to one light modulator element 121 is determined as the final rise time and an average of a plurality of fall times is determined as the final fall time. In other words, while the clearance of the slit 712 moves in a spot image of one light modulator element 121, the rise time and the fall time can be acquired by performing start and stop of output of signal light from the one light modulator element at least one time. This makes it possible to obtain the rise time and the fall time easily and rapidly.

After the response times of each light modulator element 121 are obtained, the rise time and the fall time of each light modulator element 121, with which an image of horizontal 1-dot-on and 1-dot-off lines with a constant width can be written at equal pitches, are set as a target rise time and a target fall time (hereinafter, collectively referred to as "target response times") by the shift-time determining part 242 of the calculation part 24 in FIG. 1 (Step S213), and a shift time of a switching timing at the rise (at the transition from the OFF state to the ON state) and a shift time of a switching timing at the fall (at the transition from the ON state to the OFF state) are determined so that the rise time and the fall time of each light modulator element 121 become the target rise time and the target fall time (Step S214). Shift times of all light modulator elements 121 at the rise and shift times of all light modulator elements 121 at the fall are stored as the rise shift-time table 222 and the fall shift-time table 223 in the memory 243 of the calculation part 24.

In a case where the photosensitive level of the photosensitive material is known, since output from the comparator 724 behaves in the same way as photosensing of the photosensitive material, the rise time is equal to a time from when an output start signal is inputted to the driving element 120*a* to when photosensing of the recording medium 9 is started, and the fall time is equal to a time from when an output stop signal is inputted to the driving element 120*a* to when photosensing of the recording medium 9 is stopped. As a result, the response times can be appropriately corrected only by determining a time for compensating a difference between the rise time before correction and the target rise time and a time for compensating a difference between the fall time before correction and the target fall time as a shift time at the rise and a shift time at the fall.

Figure 20:
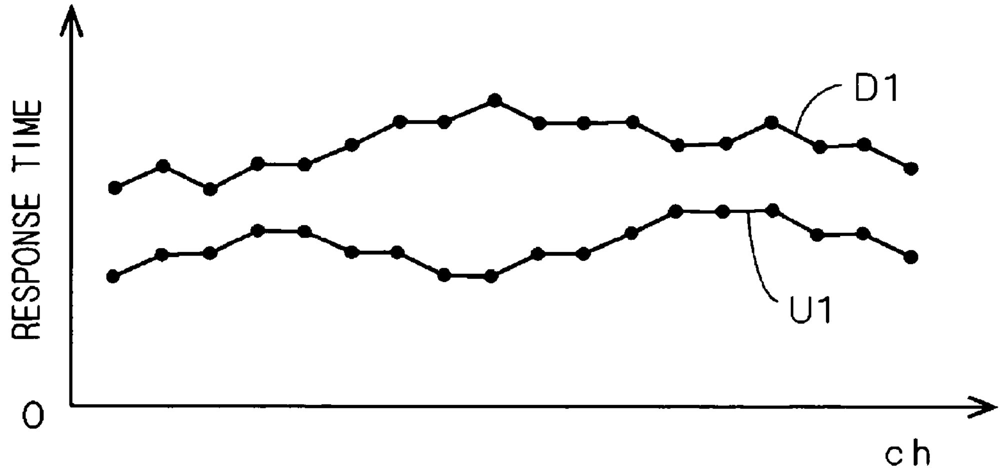
FIG. 20 is a graph showing rise times and fall times.

Through the above operation, it is possible to easily determine the shift times when the photosensitive level of the photosensitive material is known. For example, even if the rise time and the fall time acquired in Step S 212 vary between channels as shown by reference signs U1 and D1 in FIG. 20, the rise time and the fall time are made equal to the target rise time and the target fall time in all channels by reflecting the shift times, as shown by reference signs U2 and D2 in FIG. 21 in writing an image of horizontal 1-dot-on and 1-dot-off lines.

Figure 21:
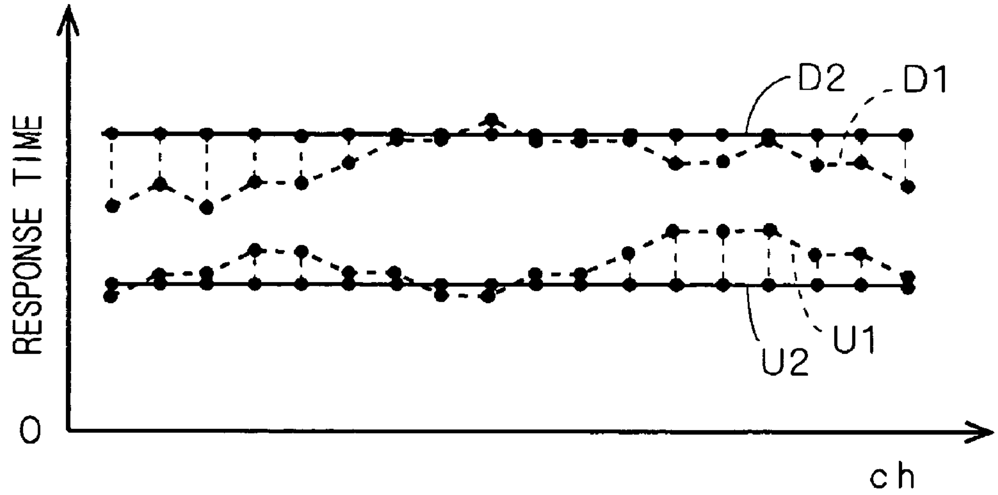
FIG. 21 is a graph showing a target rise time and a target fall time.

Naturally, FIG. 21 shows a case where switching timing of the light modulator element 121 is ideally corrected, and actually, there is slight unevenness in the rise times and the fall times after correction. Therefore, in the image recording apparatus 1, after determination of the shift times, the driving voltage table 221, the rise shift-time table 222 and the fall shift-time table 223 stored in the memory 243 are transmitted to the signal processing part 22, and measurement of the response times, that is, writing operation of image of horizontal 1-dot-on and 1-dot-off lines and movement of the slit 712 relative to the spatial light modulator 12 are performed in a state where the optical head 10 is opposed to the detection part 71, while correcting the light amounts, the rise times and the fall times with reference to these tables (Step S215). Then, it is checked whether unevenness of the rise times and unevenness of the fall times after correction fall within tolerance (Step S216) and when those falls within tolerance, the step for determining the shift times is complete. When unevenness does not fall within tolerance, the operation goes back to Step S214 to redetermine the shift times.

In redetermination of the shift times, new shift times which further compensate differences between the present rise times and fall times and the target rise time and target fall time are determined (Step S214) and response times after correction are measured again (Step S215). Steps S214 and S215 are repeated as necessary and when unevenness of the response times falls within tolerance, the step for determining the shift times is complete. Thereafter, the operation goes back to Step S14 in FIG. 7 and recording of an image is performed. In this time, when writing for a predetermined period of time is instructed to the light modulator elements 121, a distance in the main scan direction of writing actually performed on the recording medium 9 by the plurality of light modulator elements 121 is made constant by shift of switching timings of each light modulator element 121 by the clock selection part 442*a*, thereby achieving appropriate image recording.

Next, discussion will be made on an operation of the image recording apparatus 1 in a case where the photosensitive level of the photosensitive material is unknown in the process of determining the shift time.

When the photosensitive level of the photosensitive material is unknown, since the reference voltage corresponding to the light amount for photosensing the photosensitive material can not be set, a predetermined provisional reference voltage is set in the reference voltage generating circuit 723 (Step S221). Subsequently, the response times of each light modulator element 121, that is, the rise time and the fall time are measured (Step S222).

Figure 22:
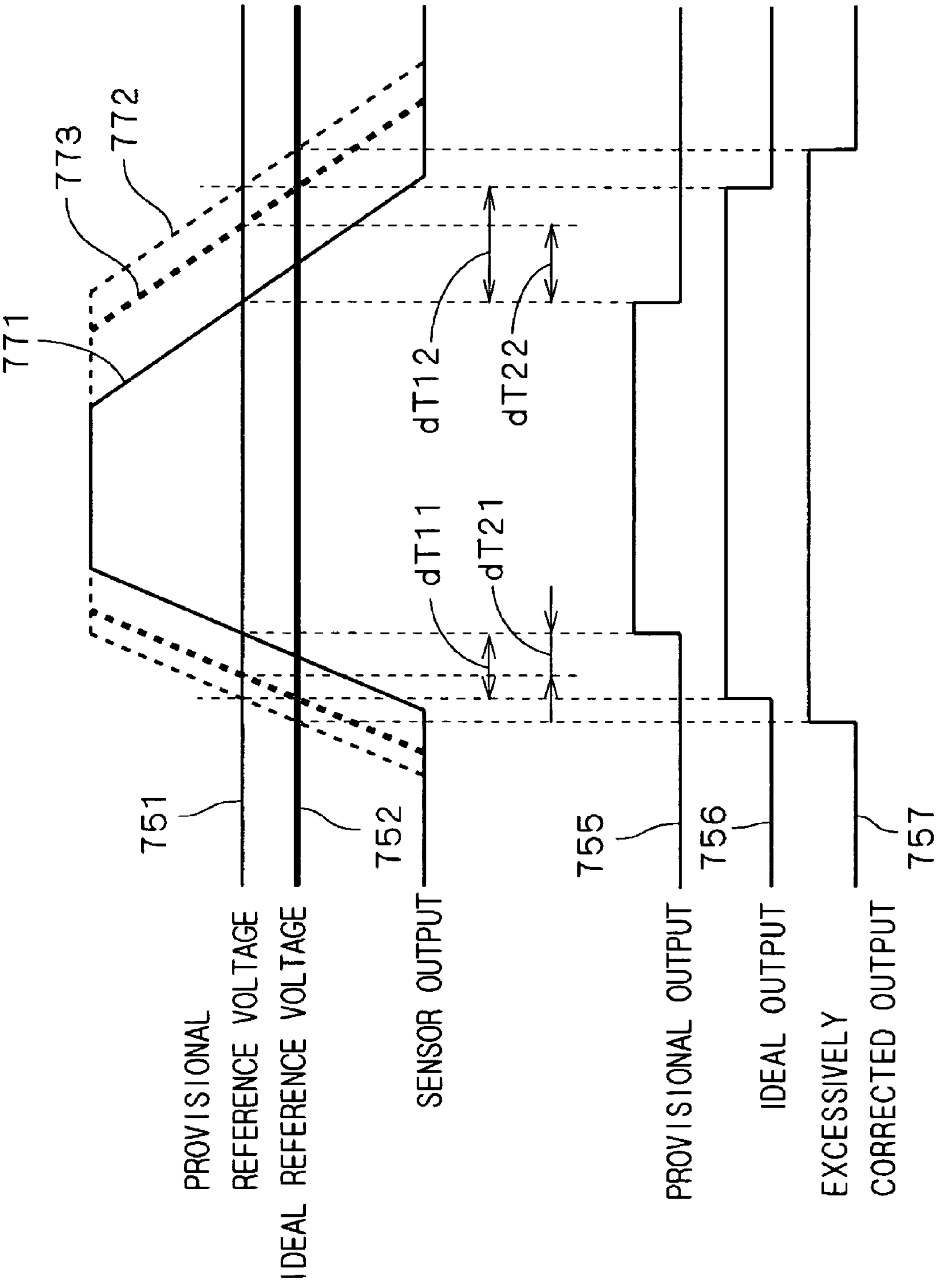
FIG. 22 is a view showing a relationship between a sensor output and a provisional reference voltage.

FIG. 22 is a view showing a relationship between a sensor output 771 from the photosensor 711 and a provisional reference voltage 751. Waveform of the sensor output 771 is simplified.

In FIG. 22, when correction of switching timing at the rise and fall is not performed, output from the comparator 724 (that is an output based on the provisional reference voltage 751 and hereinafter referred to as "provisional output") forms waveform indicated by a reference sign 755. Here, in a case where output from the comparator 724 corresponding to writing of an ideal image of horizontal 1-dot-on and 1-dot-off lines forms waveform indicated by a reference sign 756 (hereinafter, the output is referred to as "ideal output"), if calculation is performed on the basis of the provisional reference voltage 751, differences between a provisional output 755 and an ideal output 756 are determined as the shift times, and the rise time is brought forward by a shift time dT11 and the fall time is delayed by a shift time dT12. Consequently, output of the photosensor 711 after correction of switching timing forms waveform indicated by a reference sign 772.

However, when the actual photosensitive level of the photosensitive material is a reference voltage indicated by a reference sign 752 (hereinafter, the reference voltage is referred to as "ideal reference voltage"), if the response time is corrected by the shift times dT11 and dT12, a photosensing range on the photosensitive material in writing after correction (hereinafter, referred to as "excessively corrected output") is indicated by a reference sign 757, and switching timings of the light modulator element 121 are excessively corrected. In other words, sensor output at the time when the ideal output 756 is obtained on the basis of an ideal reference voltage 752 forms waveform indicated by a reference sign 773 and it is needed that the shift time at the rise is made dT21 shorter than dT11 and the shift time at the fall is made dT22 shorter than dT12 for acquisition of the ideal output in this case.

Since the photosensitive level of the photosensitive material and the ideal reference voltage are unknown, the shift times dT21 and dT22 can not be obtained by theoretical calculation. Therefore, in the image recording apparatus 1, after the response times are measured on the basis of the provisional reference voltage 751 in Step S222 of FIG. 16, the shift-time determining part 242 of the calculation part 24 sets the target response times in accordance with the provisional reference voltage 751 and determines dT11 and dT12 which are the shift times in FIG. 22 as the maximum provisional shift times (Step S223). Thereafter, assuming that a ratio of ideal shift time dT21 to the maximum provisional shift time dT11 and a ratio of ideal shift time dT22 to the maximum provisional shift time dT12 are the same, the shift-time determining part 242 further determines a plurality of pairs of provisional shift times by multiplying the maximum provisional shift times dT11 and dT12 by a plurality of ratios. A plurality of experimental writings are actually performed by control of the general control part 21 and the signal processing part 22 while using the provisional shift times, a user confirms the results by visual check and then determines the final shift times (Steps S224 to S226).

Figure 23:
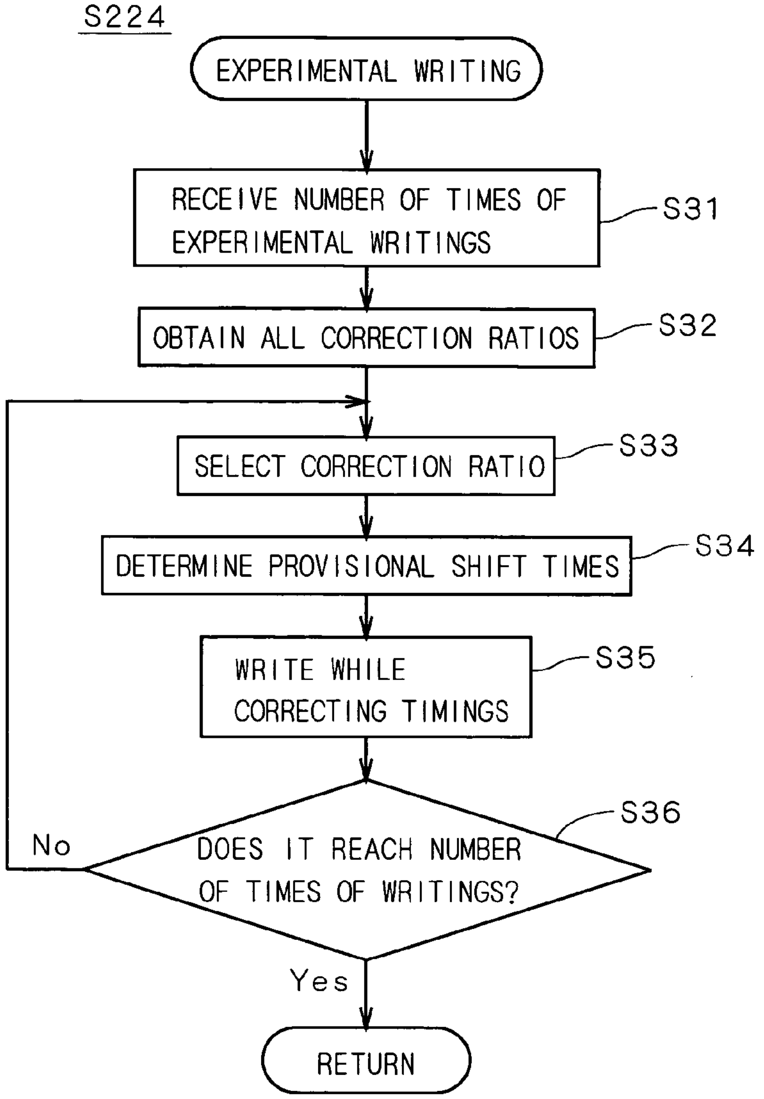
FIG. 23 is a flowchart showing an operation flow of an experimental writing.

FIG. 23 is a flowchart showing an operation flow of an experimental writing in Step S224 of FIG. 16. In the experimental writing, first, the number of times of experimental writings is inputted by a user through the input part 25 in FIG. 1 and received by the shift-time determining part 242 of the image recording apparatus 1 (Step S31). Next, in the shift-time determining part 242, in accordance with the number of times of writings, a plurality of ratios with respect to the maximum provisional shift time dT11 at the rise and the maximum provisional shift time dT12 at the fall in FIG. 22 are obtained as correction ratios (Step S32). For example, when the number of times of writings is 5, 0%, 25%, 50%, 75% and 100% are obtained as the correction ratios. When the number of times of writings is 11, 0%, 10%, 20%, . . . , 80%, 90% and 100% are obtained as the correction ratios.

After all correction ratios are obtained, one correction ratio is selected (Step S33) and new provisional shift times at the rise and fall are determined by multiplying the maximum provisional shift times dT11 and dT12, which are derived from the target response times obtained in Step S223 of FIG. 16, by the correction ratios (Step S34). Then, writing of image of horizontal 1-dot-on and 1-dot-off lines is performed under control of the shift-time determining part 242, the general control part 21 and the signal processing part 22 while switching timings of the light modulator elements 121 at the rise and fall are shifted by the new provisional shift times (Step S35). After completion of one experimental writing, it is checked whether or not writings as many as the number of times of writings are performed, that is, it is checked writing is performed at all correction ratios (Step S36) and if the next writing should be performed, selection of correction ratio, determination of provisional shift times and writing are performed again (Steps S33 to S35).

As discussed above, in the calculation part 24, a plurality of provisional shift times for compensating a difference between the rise time and the target rise time of each light modulator element 121 and a difference of the fall time and the target fall time at a plurality of correction ratios are obtained, and lines extending in the sub scan direction on the recording medium 9 are written onto the recording medium 9 while the plurality of provisional shift times are sequentially applied to each light modulator element 121. With this operation, a plurality of lines extending in the sub scan direction corresponding to the plurality of provisional shift times are arranged in the main scan direction.

Figure 24:
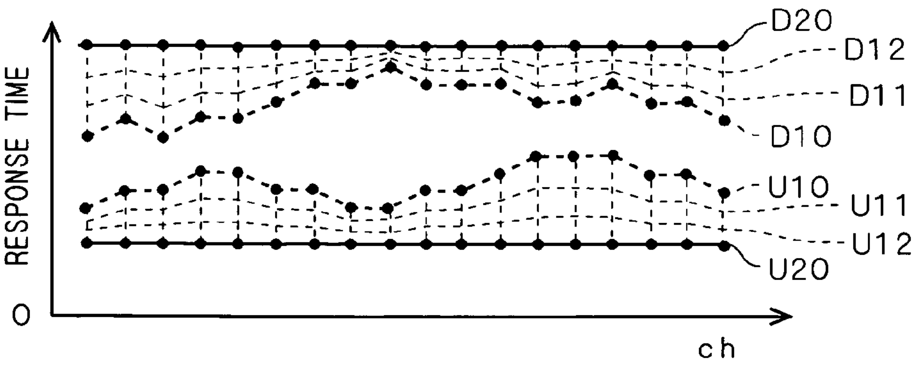
FIG. 24 is a graph showing a relationship between provisional shift times and the response times.

FIG. 24 is a graph showing a relationship between the provisional shift times and the response times. The response time of the vertical axis indicates output from the comparator 724 according to the provisional reference voltage 751 and does not correspond to the response time in the actual photosensing as discussed above. In FIG. 24, a line indicated by a reference sign U10 represents the rise time in all light modulator elements 121 according to the provisional reference voltage 751 and a line indicated by a reference sign D10 represents the fall time in all light modulator elements 121 according to the provisional reference voltage 751. A reference sign U20 represents a provisional target rise time obtained according to the provisional reference voltage 751 and a reference sign D20 represents a provisional target fall time.

For example, when the number of times of experimental writings is 4 (actually, the number of more times of writings is set), 0%, 33%, 67% and 100% are obtained as the correction ratios in Step S32. The correction ratio of 0% is selected in Step S33 and the shift times at the rise and fall are set as 0 in Step S34 and switching timings are controlled at the rise time and the fall time indicated by the reference signs U10 and D10.

Next, the correction ratio of 33% is selected in Step S33 and the shift times at the rise are 33% of differences between the rise times U10 before correction and the provisional target rise time U20 (i.e., the differences are the maximum provisional shift times) and rise timings are shifted to become those indicated by a reference sign U11 in writing. Also, the shift times at the fall are 33% of differences between the fall times D10 before correction and the provisional target fall time D20 and fall timings are shifted to become those indicated by a reference sign D11.

Similarly, when the correction ratio of 67% is selected in the next Step S33, writing is performed after the rise times are made those indicated by a reference sign U12 and the fall times are made those indicated by a reference sign D12. Finally, when the correction ratio of 100% is selected, the rise times are made those indicated by the reference sign U20 and the fall times are made those indicated by the reference sign D20, and writing is performed.

Figure 25:
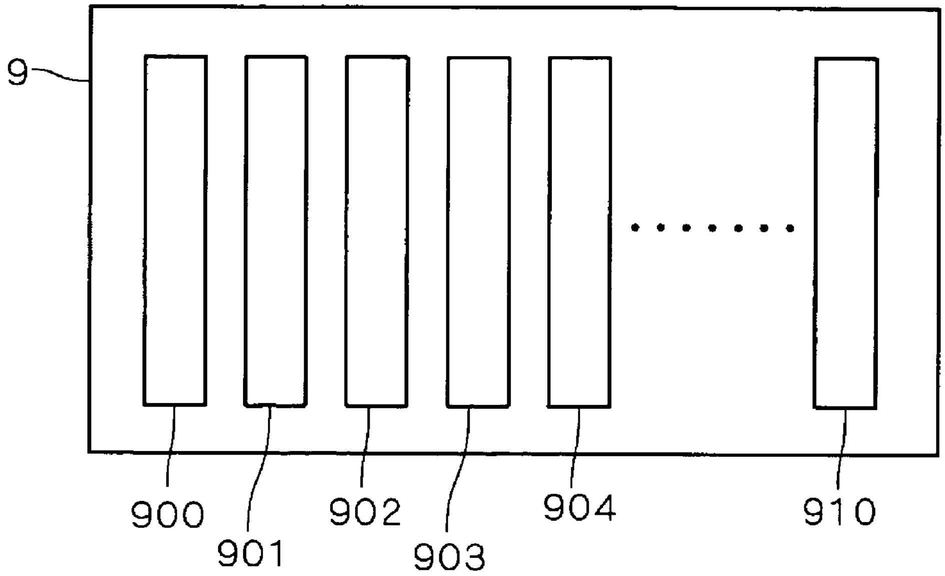
FIG. 25 is a view showing a result of an experimental writing.

Through the above operation, images of horizontal 1-dot-on and 1-dot-off lines in the cases of respective correction ratios are written on the recording medium 9. Subsequently, the operation goes back to Step S225 in FIG. 16 and states of writing of images of horizontal 1-dot-on and 1-dot-off lines are confirmed by visual check. FIG. 25 is a view illustrating a recording medium 9 in a case where the number of times of writings is set to 11 and the correction ratio is changed at every 10%. In FIG. 25, regions indicated by reference signs 900, 901, 902, 903, 904, . . . , 910 represent regions in each of which an image of horizontal 1-dot-on and 1-dot-off lines is written as an experimental pattern for inspecting unevenness at the correction ratios of 0%, 10%, 20%, 30%, 40%, . . . , 100%, respectively. As discussed above, since images of horizontal 1-dot-on and 1-dot-off lines at the plurality of correction ratios are written on one recording medium 9, it is possible to easily grasp changes in state of writing with respect to changes in the correction ratios by visual check.

The correction ratio may be changed in a limited range (for example, from 10% to 90%). In this case, for example, in Step S31, information such as the correction ratio at the start of experimental writing, amount of change of the correction ratio from the previous writing at the next writing, and the number of times of experimental writings are inputted to the calculation part 24.

After a user confirms a writing result by visual check and select a correction ratio of a region where the most appropriate writing is performed, the correction ratio or a number of the selected region is inputted to the shift-time determining part 242 through the input part 25 (FIG. 16: Step S225), the final shift times are determined on the basis of the inputted correction ratio or number in the calculation part 24 (Step S226), and then writing is performed (FIG. 7: Step S14). Consequently, when writing for a predetermined period of time is instructed to the light modulator element 121, distance in the main scan direction of writing actually performed on the recording medium 9 by the plurality of light modulator elements 121 is made constant by shift of switching timings of each light modulator element 121 by the clock selection part 442*a*, thereby achieving appropriate image recording. For the next and subsequent writings, the shift times are stored in the memory 243 as the rise shift-time table 222 and the fall shift-time table 223 which are part of the correction data, however, the maximum provisional shift times and the correction ratio may be stored instead of the shift times.

As discussed above, in the image recording apparatus 1, when the photosensitive level of the photosensitive material on the recording medium 9 is unknown, since the plurality of provisional shift times are obtained on the basis of the provisional reference voltage 751 and the final shift times are determined after experimental writings, it is possible to determine the shift times relatively easily and record an image appropriately, even if the photosensitive level is unknown. Normally, if it is tried to obtain the ideal reference voltage, it is necessary to check writing results by writing many times while changing the reference voltage or the shift times by trial and error, however, in the above experimental writing, since the ideal shift times are obtained through one writing without changing the provisional reference voltage 751, it is possible to perform appropriate writing efficiently. It can be also said that to change the correction ratios is equivalent to assume a plurality of ideal reference voltages 752 in FIG. 22 and in the above operation, it can be also regarded that experimental writing is performed while estimating the photosensitive level of the photosensitive material.

In the above method of changing the correction ratios, when the ideal reference voltage 752 is lower than the provisional reference voltage 751, as shown in FIG. 24, it is necessary that the target rise time U20 is earlier than the rise time U10 according to the provisional reference voltage 751 in any light modulator element 121 and the target fall time D20 is later than the fall time D10 according to the provisional reference voltage 751 in any light modulator element 121. Conversely, when the ideal reference voltage 752 is higher than the provisional reference voltage 751, it is necessary that the target rise time U20 is later than the rise time U 10 in any light modulator element 121 and the target fall time D20 is earlier than the fall time D10 in any light modulator element 121.

Since an approximate photosensitive level can be known in advance, the provisional reference voltage 751 is set to satisfy the above conditions in the image recording apparatus 1. When it is found in experimental writing that the provisional reference voltage 751 does not satisfy the above conditions, the provisional reference voltage 751 is reset to satisfy the above conditions.

Figure 26:
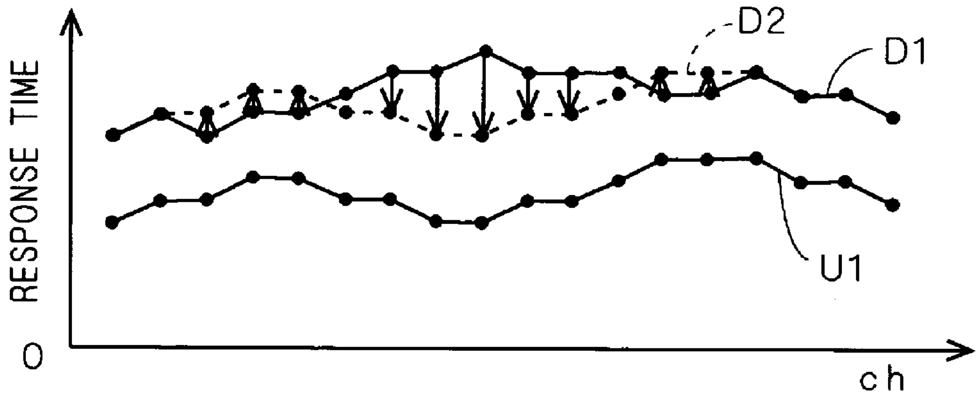
FIG. 26 is a graph showing another operation for obtaining shift times.

FIG. 26 is a graph showing another operation in Steps S213 and S214 of FIG. 16. In FIG. 26, rise times U1 are not corrected and fall times D1 are corrected as indicated by a reference sign D2, and the shift times at the fall are shown by arrows. Since unevenness of the fall times D2 after correction among the light modulator elements 121 are the same as those of the rise times U1, when writing an image of horizontal 1-dot-on and 1-dot-off lines, each line extending in the sub scan direction is slightly distorted, however, the width of each line is made constant. Only if the width of the line is constant, the ill effect on quality of writing does not occur because distortion of image of horizontal 1-dot-on and 1-dot-off lines is incognizable. As a result, it is possible to perform appropriate writing by shifting only rise timings.

The shift times are set only to the rise times and the fall times are not changed, and writing of image of horizontal 1-dot-on and 1-dot-off lines with a constant width may be achieved. Specifically, by shifting only switching timing of each light modulator element after one of the output start signal and the output stop signal is inputted to the driving element 120*a* connected to each light modulator element 121, it is possible to correct switching timing more easily. In other words, if the shift time is obtained as a time for compensating a difference between a predetermined value (constant value) and a difference between the rise time and the fall time, the target rise time and the target fall time may not be set.

The method of correcting only one of the rise time and the fall time, that is, the method of shifting only switching timing after only one of the output start signal and the output stop signal is inputted to the driving element 120*a* connected to each light modulator element 121, may be used in experimental writing. In this case, the maximum provisional shift times, which make differences between the rise times and the fall times a predetermined value, are obtained only for one of the rise times and the fall times, and the plurality of provisional shift times are obtained by multiplying the maximum provisional shift times by the plurality of correction ratios, respectively. In other words, if the provisional shift time is obtained as a time for compensating a difference between a predetermined value (constant value) and a difference between the rise time and the fall time at the plurality of correction ratios, the target rise time and the target fall time may not be set.

Figure 27:
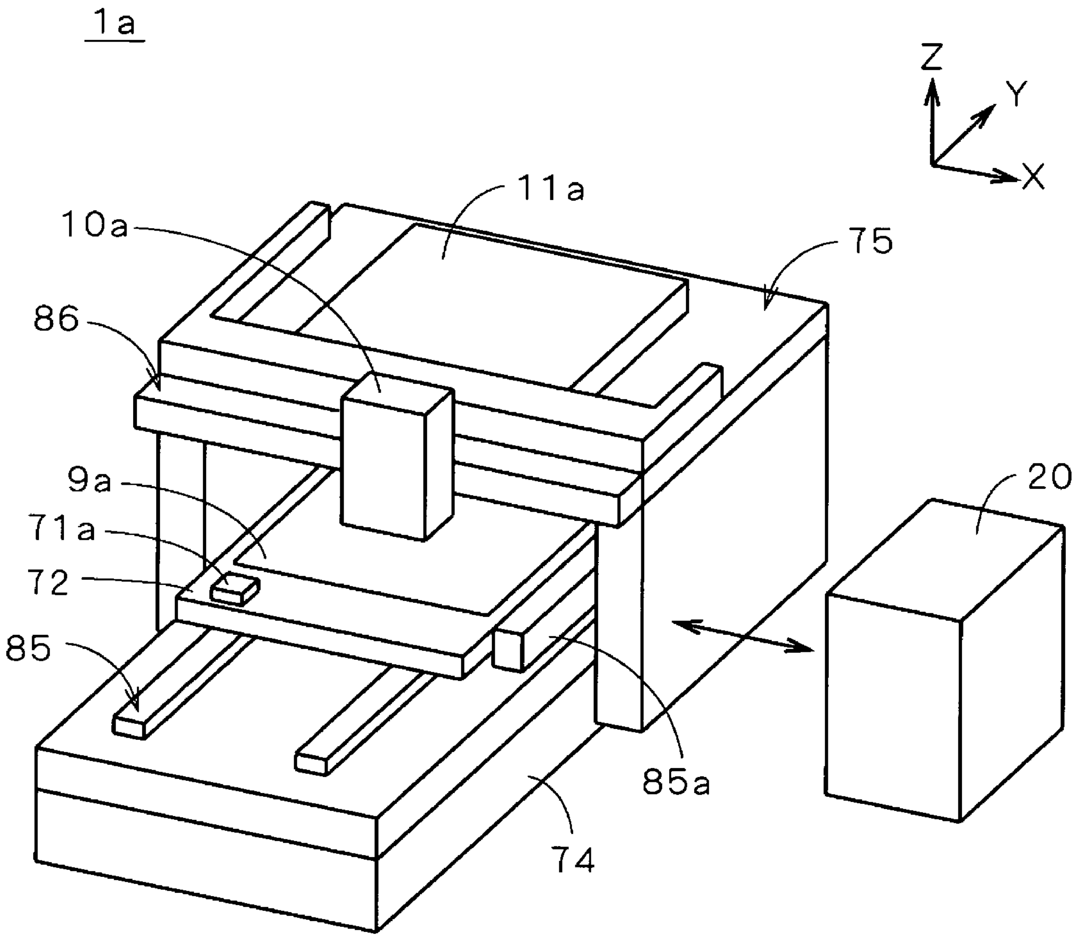
FIG. 27 is a perspective view showing a construction of an image recording apparatus in accordance with a second preferred embodiment.
Figure 28:
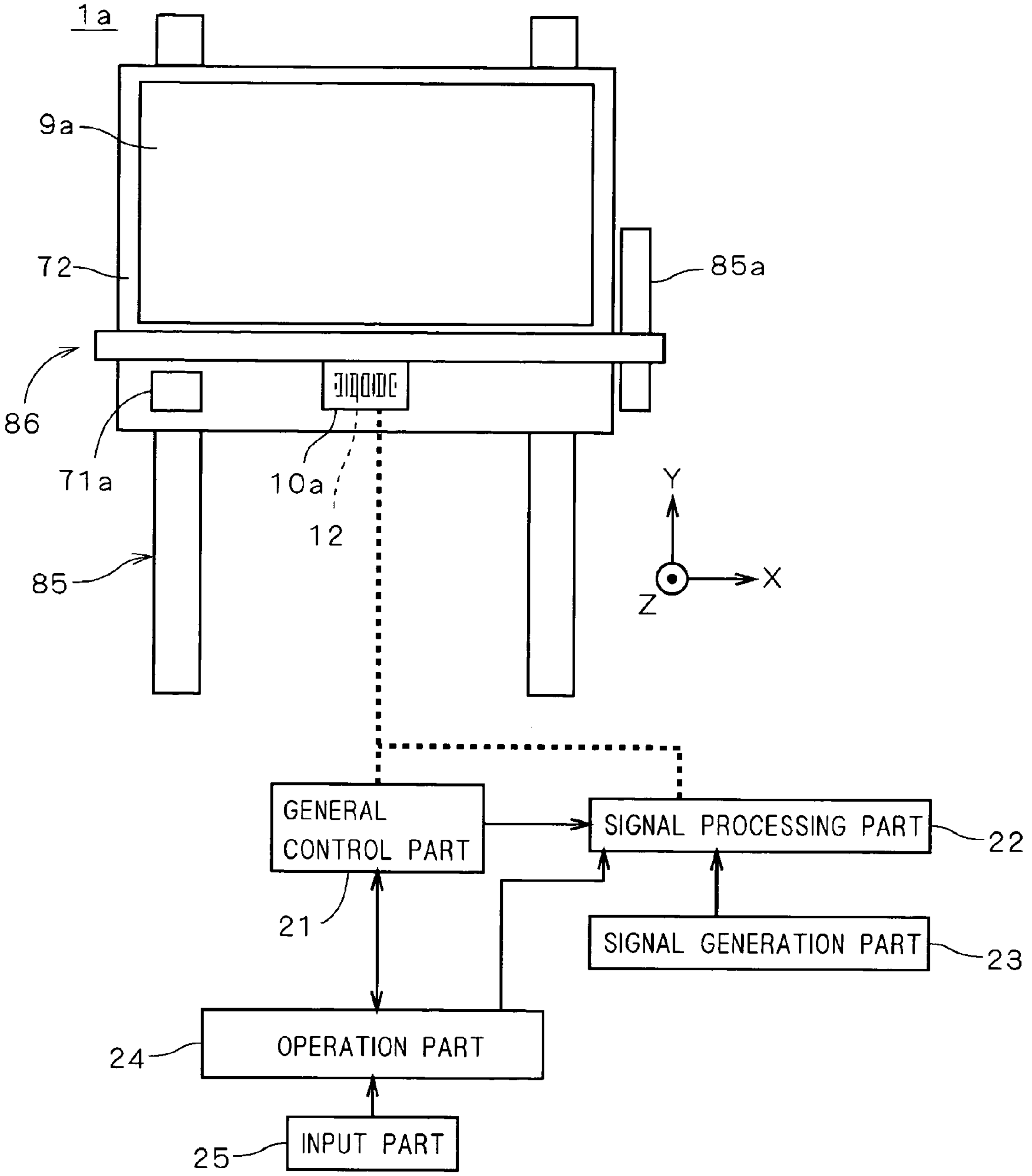
FIG. 28 is a view showing main constituent elements of the image recording apparatus.

FIG. 27 is a perspective view showing an appearance of an image recording apparatus 1*a* in accordance with the second preferred embodiment of the present invention and FIG. 28 is a view showing mechanical principal parts and a functional constitution of the image recording apparatus 1*a*. The general control part 21, the signal processing part 22, the signal generation part 23, the calculation part 24, and the input part 25 in FIG. 28 are the same as those in the first preferred embodiment, and they are provided in a control unit 20 of FIG. 27.

The image recording apparatus 1*a* is an apparatus for recording an image of a pattern of mask, wire or the like on a glass substrate 9*a* (i.e., writing by exposure) for manufacturing a glass mask, a TFT (Thin Film Transistor) liquid crystal panel or the like, and in the image recording apparatus 1*a*, in the broad sense, the glass substrate 9*a* coated with a photosensitive material is a recording medium which is a physical material where information of image is recorded. The image recording apparatus 1*a* comprises a table 72 for holding the glass substrate 9*a* on its surface on the (+Z) side and on the other side of the table 72, a table moving mechanism 85 for moving the table 72 in the Y direction (main scan direction) is fixed on a base part 74. A position detecting module 85*a* for detecting position of the table 72 is provided on the base part 74. An optical head 10*a* for emitting light toward the glass substrate 9*a* is located above the table 72 and the optical head 10*a* is supported by a head moving mechanism 86, being movable in the X direction which is the sub scan direction. In other words, the main scan direction and the sub scan direction are parallel to the table 72, and the table moving mechanism 85 and the head moving mechanism 86 function as a mechanism for moving the table 72 relatively to the optical head 10*a* including the spatial light modulator 12 (see FIG. 28) at a constant speed in the main scan direction and also moving the table 72 relatively to the optical head 10*a* in the sub scan direction perpendicular to the main scan direction. As shown in FIG. 27, a frame 75 is attached to the base part 74 over the table 72 and the head moving mechanism 86 is fixed on the frame 75.

As shown in FIG. 27, in the image recording apparatus 1*a*, a light source 11*a* is positioned on the frame 75 and light from the light source 11*a* is directed in the optical head 10*a* through optical fibers which are not shown. A film of photosensitive material (i.e., resist) to be photosensed by irradiation with ultraviolet rays is previously formed on the main surface on the (+Z) side of the glass substrate 9*a* in this preferred embodiment. The constituent elements of the optical head 10*a* are the same as those of the optical head 10 in FIG. 2 except that the light source 11*a* is positioned outside. As shown in FIG. 28, though the arrangement direction of the plurality of light modulator elements 121 (see FIG. 3) of the spatial light modulator 12 provided in the optical head 10*a* corresponds to the sub scan direction which is the X direction, the arrangement direction of the plurality of light modulator elements 121 do not necessarily have to correspond to the sub scan direction only if the arrangement direction is a direction crossing the main scan direction which is the Y direction of the optical head 10*a*. In other words, as in the first preferred embodiment, the main scan direction which is the moving direction of the glass substrate 9*a* has only to be a direction crossing the arrangement direction of positions irradiated with light.

As shown in FIGS. 27 and 28, on the table 72, a detection part 71*a* is provided in a position which is on the corner on the (−Y) side and (−X) side of the table 72 and the position doesn't overlap with the glass substrate 9*a*. The detection part 71*a* has the same construction as the detection part 71 in FIG. 8 except that the detection part 71*a* receives light emitted from the optical head 10*a* in the (−Z) direction. The width (width in the direction corresponding to the arrangement direction of the light modulator elements 121) of the clearance formed in the slit 712 (see FIG. 8) of the detection part 71*a* is made half of a width in the sub scan direction of a spot image of one light modulator element 121. Since resolution of the detection part 71*a* increases inverse proportionally to the width of the clearance, the width of the clearance may be less than half of the width in the sub scan direction of a spot image of one light modulator element 121.

An operation for recording an image onto the photosensitive material on the glass substrate 9*a* in the image recording apparatus 1*a* is the same as in FIG. 7 except that a transfer path of irradiation positions of light on the glass substrate 9*a* differs in that of the image recording apparatus 1 of FIG. 1. Specifically, first, in Step S11 it is checked whether or not correction data is stored (Step S1) and when the stored correction data can be used without modification, writing is performed (Steps S12 to S14).

When the correction data corresponding to the photosensitive material of the glass substrate 9*a* which is to be exposed is not stored (Step S11), measurement of light amounts (Step S16) is performed and the operation goes to correction of light amounts (Step S19). When checking modification is necessary though the correction data is stored (Step S12), measurement of light amounts (Step S17) is performed and if it is confirmed that correction is not needed, writing (Steps S18, S13, S14) is performed and if correction is necessary, the operation goes to correction of light amounts (Step S19).

In measurement of light amounts (Steps S16, S17), the optical head 10*a* moves up to a position opposed to the detection part 71*a* by driving the table moving mechanism 85 and the head moving mechanism 86, and a light amount emitted from each light modulator element 121 is sequentially measured through the slit 712 like the first preferred embodiment while the optical head 10*a* is moved in the sub scan direction at a low speed by the head moving mechanism 86. In other words, the head moving mechanism 86 functions as a slit moving mechanism for moving the slit 712 relatively to the light modulator elements 121.

Following correction of light amounts (Step S19) after measurement of light amounts, determination of shift times (Step S2) is performed and the operation goes to writing (Step S14). Operations of correction of light amounts and determination of shift times are the same as those in the first preferred embodiment.

In writing on the glass substrate 9*a* (recording by exposure) (Step S14), first, the table 72 is moved relatively to the optical head 10*a* including the spatial light modulator 12 in the (−Y) direction by the table moving mechanism 85 and irradiation positions of light from the optical head 10*a* on the glass substrate 9*a* are thereby continuously moved relatively to the glass substrate 9*a* in the (+Y) direction (i.e., main scanning is performed). In parallel with movement of the table 72, writing is performed in synchronization with a signal outputted from the position detecting module 85*a* and in this time, the general control part 21 and the signal processing part 22 perform correction of light amounts according to the driving voltage table 221 (see FIG. 6) and shift of switching timings at the rise and fall according to the rise shift-time table 222 and the fall shift-time table 223. With this operation, appropriate writing is performed on a strip-like region (swath) which extends in the Y direction with a width corresponding to the size of a spot image of the spatial light modulator 12.

When the irradiation positions reach an end of the glass substrate 9*a* on the (+Y) side, the optical head 10*a* moves in the sub scan direction (X direction) by a distance corresponding to width of the strip-like region in the X direction and the moving direction of the table 72 is reversed. Writing in a backward path of the table 72 is performed on a new strip-like region in contact with the side of the strip-like region written in a forward path. Then, in the image recording apparatus 1*a*, the optical head 10*a* intermittently moves in the X direction while the table 72 reciprocally moves in the Y direction, to record an image on the whole of the plane glass substrate 9*a*.

As discussed above, in the image recording apparatus 1*a*, when light is applied to the glass substrate 9*a* for manufacturing a glass mask, a TFT liquid crystal panel or the like, since light amounts from respective light modulator elements 121 are made uniform and the rise times and the fall times are made uniform, it is possible to increase quality of a recorded image.

Though the preferred embodiments of the present invention have been discussed above, the present invention is not limited to the above-discussed preferred embodiments, but allows various variations.

The recording medium 9 and the glass substrate 9*a* may be traveled by other methods only if they can move relatively to the optical heads 10 and 10*a*. The recording medium carrying image information may be other material coated with photosensitive material such as a printed circuit board, a semiconductor substrate or the like, or may be other material with photosensitivity.

Though the zeroth order light beam is used as the signal light for writing in the above preferred embodiments, the first order diffracted light beams may be used as the signal light. Unlike the relative positional relation between the moving ribbons 121*a* which are not sagged and the fixed ribbons 121*b* in the above preferred embodiments, the light modulator element 121 which emits the zeroth order light beam in the state where the moving ribbons 121*a* sag may be used. In these cases, appropriate image recording can be achieved by shifting a switching timing of the light modulator element 121.

If the moving ribbons 121*a* and the fixed ribbons 121*b* can be regarded as strip-like reflection surfaces, these surfaces do not have to be in a ribbon shape in a strict meaning. For example, upper surfaces of block shapes may serve as the reflection surfaces of fixed ribbons.

The light modulator element 121 is not limited to the diffraction grating type one, but may be a liquid crystal shutter or the like only if it is a multichannel type. Further, the light modulator elements 121 are not limited to those that reflect light, but a laser array, for example, may perform the function as the light modulator element 121. Also in these cases, unevenness of the rise times and the fall times by irradiation with light from elements is corrected by shift of switching timings, thereby achieving appropriate image recording. The above correction of switching timings is especially suitable for a light modulator element where the rise time and the fall time change in correction of light amount, that is, when intensity of signal light is changed.

A two-dimensional spatial light modulator may be used and in this case, correction for the plurality of light modulator elements 121 in the above preferred embodiments is applied to each one-dimensional array of the light modulator element 121.

The structure of functions of the calculation part 24 may be partially or completely constructed as a dedicated electric circuits.

Though the shift times of each light modulator element 121 is obtained on the basis of the rise time and the fall time before correction in the above preferred embodiments, the shift times may be obtained on the basis of a state of output from the photosensor 711 at the rise and fall (for example, ratio of change in output to time). Generally discussing, the shift time of switching timing of a light modulator element 121 after input of the output start signal instructing start of output of signal light or the output stop signal instructing stop of output of signal light to the driving element 120*a* connected to the light modulator element 121 is obtained on the basis of output of the photosensor 711 which is a photodetector after input of the output start signal or the output stop signal, and it is thereby possible to achieve appropriate writing by correcting the switching timing with respect to the signal controlling output.

The light amount from each light modulator element 121 and the rise time and the fall time are measured by moving the slit 712 in the sub scan direction in the above preferred embodiments, but may be measured by a mechanism other than the slit, for example, a CCD having a plurality of light receiving elements which are long in the sub scan direction or a CCD having a two-dimensional array of light receiving elements.

Though the shift times are obtained after measurement of the response times of all light modulator elements 121 in Steps S212 to S214 of FIG. 16 in the above preferred embodiments, measurement of response time and determination of shift time may be sequentially performed on every light modulator element 121 and in this case, with respect to Step S212 of detecting light from the light modulator element 121, Step S214 of obtaining the shift times is performed almost in parallel (i.e., alternately performed on every element).

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2005-283340 filed in the Japan Patent Office on Sep. 29, 2005 and Japanese Patent Application No. 2006-121708 filed in the Japan Patent Office on Apr. 26, 2006, the entire disclosure of which is incorporated herein by reference.

What is claimed is:

1. An image recording apparatus for recording an image on a recording medium by irradiation with light, comprising:

a spatial light modulator having a plurality of light modulator elements which are arranged in a predetermined direction;

a holding part for holding a recording medium on which an image is recorded with signal lights from said plurality of light modulator elements;

a moving mechanism for moving said holding part relatively to said spatial light modulator at a constant speed in a main scan direction crossing an arrangement direction of positions irradiated with light from said plurality of light modulator elements and moving said holding part relatively to said spatial light modulator in a sub scan direction crossing said main scan direction;

a control part controlling said spatial light modulator and said moving mechanism, to perform image recording on a recording medium;

a photodetector for detecting light from each element of said plurality of light modulator elements; and a shift-time determining part for determining a shift time of a switching timing of said each element after input of an output start signal instructing start of output of signal light or an output stop signal instructing stop of output of signal light to a driving element connected to said each element, on the basis of output of said photodetector after input of an output start signal or an output stop signal, wherein said shift-time determining part comprises a circuit generating a reference voltage, a comparator for comparing output from said photodetector with said reference voltage, and a clock generating circuit sampling clocks; and a counter for counting said sampling clocks, to acquire a rise time from when an output start signal is inputted to said driving element connected to said each element to when said comparator detects that output from said photodetector is above said reference voltage and a fall time from when an output stop signal is inputted to said driving element to when said comparator detects that output from said photodetector is below said reference voltage, said shift time of said each element is determined on the basis of said rise time and said fall time, said driving element comprises a shift section for shifting a switching timing of said each element at the time when an output start signal or an output stop signal is inputted to said driving element in image recording, in accordance with said shift time, and when writing for a predetermined period of time is instructed, a distance in said main scan direction of writing actually performed on a recording medium by said plurality of light modulator elements is made constant by shift of a switching timing of said each element by said shift section.

2. The image recording apparatus according to claim 1, further comprising:

a slit being located at an image forming position of said plurality of light modulator elements between said photodetector and said spatial light modulator, said slit having a clearance with a width narrower than a width of a spot image of one light modulator element with respect to said sub scan direction; and a slit moving mechanism for moving said slit relatively to said spatial light modulator in said sub scan direction, wherein while said clearance of said slit moves in a spot image of one light modulator element, said rise time and said fall time are acquired by performing start and stop of output of signal light from said one light modulator element at least one time.

3. The image recording apparatus according to claim 1, wherein said rise time is equal to a time from when an output start signal is inputted to said driving element connected to said each element to when photosensing of a recording medium is started, and said fall time is equal to a time from when an output stop signal is inputted to said driving element to when photosensing of said recording medium is stopped, and said shift time of said each element is determined as a time for compensating a difference between a predetermined value and a difference between said rise time and said fall time in said shift-time determining part.

4. The image recording apparatus according to claim 1, wherein said shift-time determining part obtains a plurality of provisional shift times for compensating a difference between a predetermined value and a difference between said rise time and said fall time of said each element at a plurality of correction ratios, lines extending in said sub scan direction are written onto said recording medium by said control part and said shift section while said plurality of provisional shift times are sequentially applied to said each element, and a correction ratio selected on the basis of a writing result out of said plurality of correction ratios is inputted to said shift-time determining part and said shift time of said each element is determined on the basis of said correction ratio.

5. The image recording apparatus according to claim 1, wherein said each element is an element for mechanically modulating light and change in output from said comparator is ignored during a predetermined period of time after input of an output start signal and an output stop signal to said driving element connected to said each element.

6. The image recording apparatus according to claim 1, wherein with respect to said each element, when intensity of signal light is changed, said rise time and said fall time change.

7. The image recording apparatus according to claim 1, wherein said each element is a light modulator element of diffraction grating type in which strip-like fixed reflection surfaces and strip-like moving reflection surfaces are alternately arranged.

8. The image recording apparatus according to claim 1, wherein said shift section shifts only a switching timing of said each element after one of an output start signal and an output stop signal is inputted to said driving element connected to said each element.

9. The image recording apparatus according to claim 1, wherein said holding part is a holding drum for holding a recording medium on its outer surface and a central axis of said holding part is parallel to said sub scan direction, and said moving mechanism comprises a mechanism for rotating said holding drum about said central axis; and a mechanism for moving said spatial light modulator in parallel with said central axis.

10. The image recording apparatus according to claim 1, wherein said holding part is a table for holding a substrate which is a recording medium, and said moving mechanism moves said spatial light modulator relatively to said table in said main scan direction and said sub scan direction which are parallel to said table.

11. An image recording method for recording an image on a recording medium by irradiation with light, comprising the steps of:

a) moving a recording medium relatively to a plurality of light modulator elements at a constant speed in a main scan direction crossing an arrangement direction of positions irradiated with light from said plurality of light modulator elements and moving said recording medium relatively to said plurality of light modulator elements in a sub scan direction crossing said main scan direction, while outputting signal lights from said plurality of light modulator elements which are arranged in a predetermined direction;

b) detecting light from each element of said plurality of light modulator elements by a photodetector before said step a); and c) in parallel with said step b) or after said step b), determining a shift time of a switching timing of said each element after input of an output start signal instructing start of output of signal light or an output stop signal instructing stop of output of signal light to a driving element connected to said each element, on the basis of output of said photodetector after input of an output start signal or an output stop signal, wherein in said step c), a rise time from when an output start signal is inputted to said driving element connected to said each element to when it is detected that output from said photodetector is above a predetermined reference voltage and a fall time from when an output stop signal is inputted to said driving element to when it is detected that output from said photodetector is below said reference voltage are acquired, and said shift time of said each element is determined on the basis of said rise time and said fall time, a switching timing of said each element after input of an output start signal or an output stop signal is shifted in accordance with said shift time in said step a), and when writing for a predetermined period of time is instructed, a distance in said main scan direction of writing actually performed on a recording medium by said plurality of light modulator elements is made constant by shift of a switching timing of said each element.

12. The image recording method according to claim 11, wherein said rise time is equal to a time from when an output start signal is inputted to said driving element connected to said each element to when photosensing of a recording medium is started, and said fall time is equal to a time from when an output stop signal is inputted to said driving element to when photosensing of said recording medium is stopped, and said shift time of said each element is determined as a time for compensating a difference between a predetermined value and a difference between said rise time and said fall time in said step c).

13. The image recording method according to claim 11, wherein said step c) comprises the steps of obtaining a plurality of provisional shift times for compensating a difference between a predetermined value and a difference between said rise time and said fall time of said each element at a plurality of correction ratios;

writing lines extending in said sub scan direction onto said recording medium while sequentially applying said plurality of provisional shift times to said each element;

selecting one of said plurality of correction ratios on the basis of a writing result; and determining said shift time of said each element on the basis of a selected correction ratio.

14. The image recording method according to claim 11, wherein with respect to said each element, when intensity of signal light is changed, said rise time and said fall time change.

15. The image recording method according to claim 11, wherein said each element is a light modulator element of diffraction grating type in which strip-like fixed reflection surfaces and strip-like moving reflection surfaces are alternately arranged.

16. The image recording method according to claim 11, wherein only a switching timing of said each element after input of one of an output start signal and an output stop signal to said driving element connected to said each element is shifted in said step c).

* * * * *